United States Patent [19]

Asaoka et al.

[11] 4,367,165

[45] Jan. 4, 1983

[54] CATALYST FOR HYDROTREATING HEAVY HYDROCARBON OILS AND METHOD OF PREPARING SAME

[75] Inventors: Sachio Asaoka, Yokohama; Takeo Ono, Kawasaki; Yoshimi Shiroto, Yokohama, all of Japan

[73] Assignee: Chiyoda Chemical Engineering & Construction Co., Ltd., Yokohama, Japan

[21] Appl. No.: 210,049

[22] Filed: Nov. 24, 1980

[30] Foreign Application Priority Data

Nov. 27, 1979 [JP] Japan .................................. 54-153132

[51] Int. Cl.³ ........................ B01J 21/16; B01J 21/00
[52] U.S. Cl. .................................. 252/457; 252/432; 252/456
[58] Field of Search ................... 252/457, 456, 432

[56] References Cited

U.S. PATENT DOCUMENTS 4,080,313  3/1978  Whittam ........................ 252/457 X
4,196,102  4/1980  Inooka et al. ....................... 252/457

Primary Examiner—Carl F. Dees
Attorney, Agent, or Firm—Armstrong, Nikaido, Marmelstein & Kubovcik

[57] ABSTRACT

A catalyst for hydrotreating a heavy hydrocarbon oil comprises a carrier which is a calcined composite of a mixture of a clay mineral consisting mainly of magnesium silicate having a double-chain structure and a pseudoboehmite which shows a powder X-ray diffraction spectrum obtained by applying a $CuK_\alpha$ ray such that the half value width of the peak on the (020) plane is between about 0.8° and 4.0° and the intensity of said peak is between 1.2 and 8.0 times as high as that at $2\theta = 10°$. At least one catalytic metal component is composited with the carrier, the metal of the catalytic metal component being selected from the group consisting of metals belonging to Groups VB, VIB, VIII and IB of the Periodic Table. Disclosed also are a method of preparing such a catalyst, and a process for the hydrotreatment of heavy hydrocarbon oils containing asphaltenes and heavy metals.

16 Claims, 11 Drawing Figures

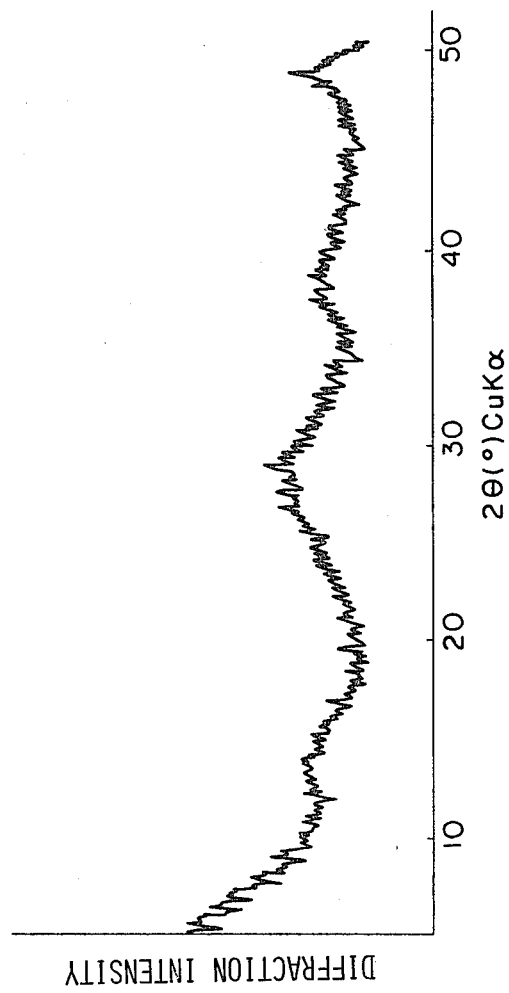
F I G. 1

F I G. 7
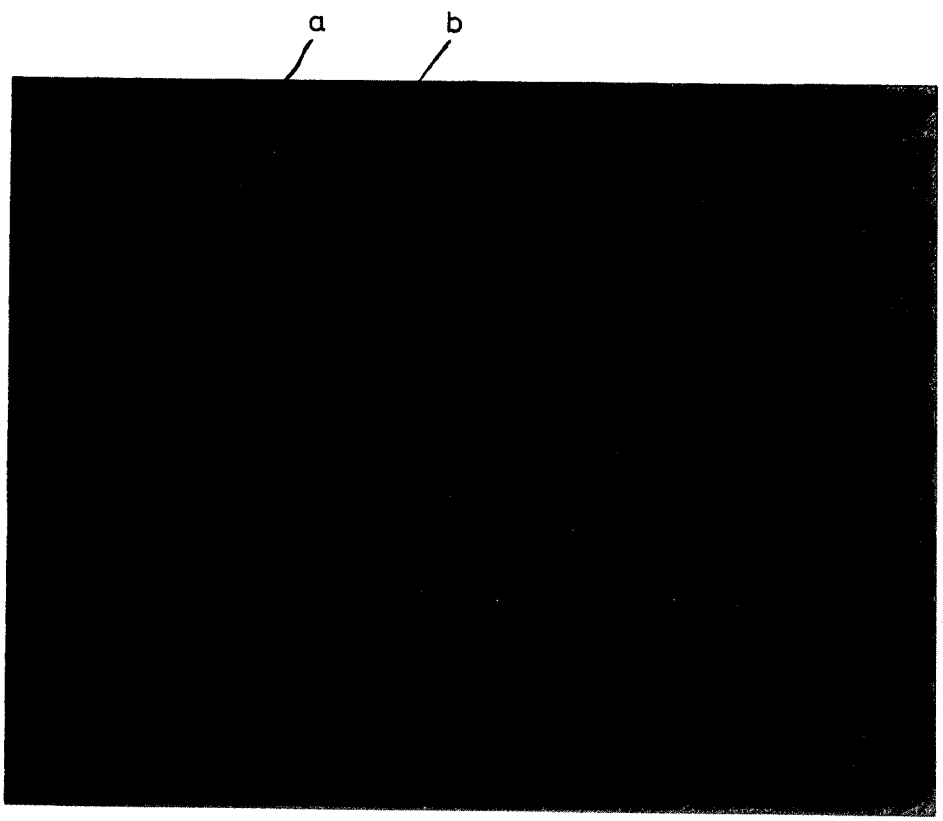

F I G. 8
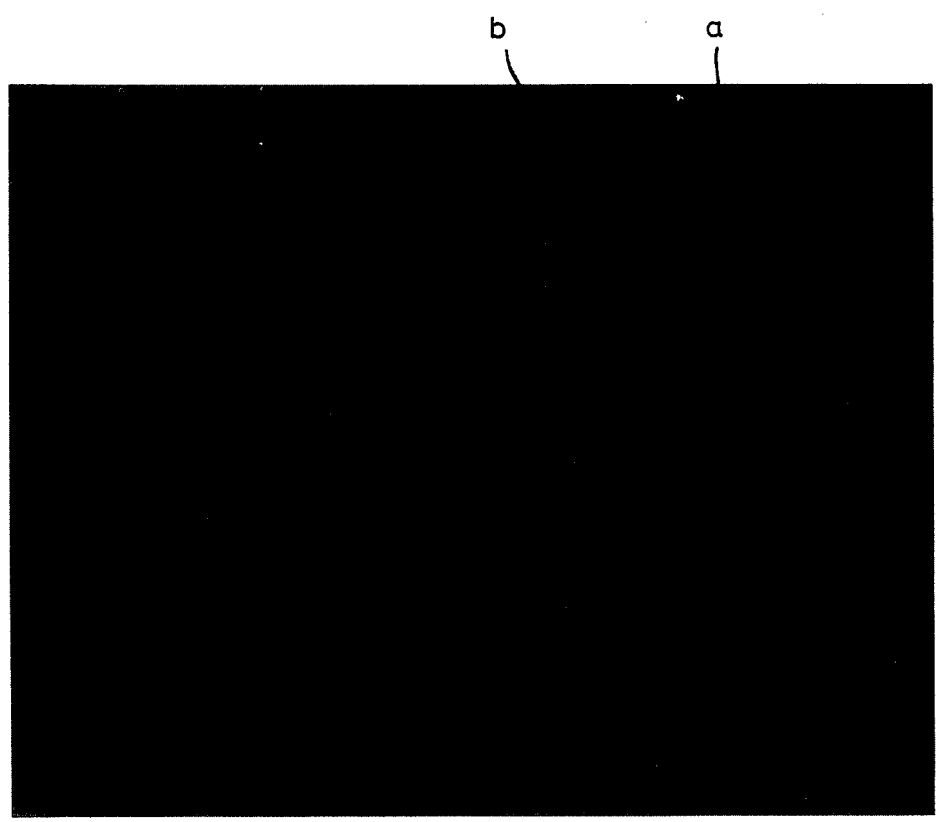

CATALYST FOR HYDROTREATING HEAVY HYDROCARBON OILS AND METHOD OF PREPARING SAME

BACKGROUND OF THE INVENTION

1. Field of the Invention

This invention relates to a novel catalyst which is useful for the hydrotreatment of heavy hydrocarbon oils, and a method of preparing such a catalyst. This invention is also concerned with a process for hydrotreating heavy hydrocarbon oils.

2. Description of the Prior Art

Heavy hydrocarbon oils such as heavy crude oils, reduced crude oils, vacuum residues, heavy oils extracted from tar sand and mixtures thereof, contain non-distillable, high molecular coke precursors usually called asphaltenes which are insoluble in light hydrocarbons such as pentane and heptane, and undesirable impurities such as oil-soluble organic metal compounds containing vanadium, nickel or the like and sulfur or nitrogen compounds. These impurities are often found for the greater part in high molecular hydrocarbon fractions, such as asphaltenes. This is a significant cause for the difficulty involved in the catalytic hydrotreatment of heavy hydrocarbon oils. The term "hydrotreatment" used herein means the treatment of heavy hydrocarbon oils in a hydrogen atmosphere for the purpose of converting asphaltenes and other high molecular hydrocarbon fractions in the heavy hydrocarbon oil into distillable hydrocarbon fractions, or hydrocarbon fractions which are soluble in a light hydrocarbon, to thereby reduce any such high molecular fraction, and simultaneously removing or reducing the aforementioned metal, sulfur and nitrogen compounds.

Hydrodesulfurization and hydrocracking are known to be effective processes for obtaining high grade light oils from heavy hydrocarbon oils on a commercial scale. These processes employ a fixed or ebullated bed of a catalyst composed of a metal such as cobalt, nickel, molybdenum and tungsten supported on a carrier formed of activated alumina such as γ-alumina, η-alumina and χ-alumina, or silica alumina, or the like. [M. W. Ranney, Chemical Technology Review No. 54, Desulfurization of Petroleum, Noyes Data Corporation, New Jersey (1975).] These processes, however, encounter a number of problems if the heavy hydrocarbon oil to be treated contains asphaltenes and heavy metals. The asphaltenes in the oil are in the form of colloidally dispersed macromolecules, and cannot easily diffuse into the active sites in the pores of the catalyst. This seriously inhibits the hydrocracking of the asphaltenes. The presence of asphaltenes heavily promotes the formation of coke and carbonaceous matters, which leads to a considerable reduction in the activity of the catalyst. These problems define a great obstacle to the industrial-scale hydrotreatment of heavy hydrocarbon oils.

A further problem, which is as important as those hereinabove discussed, is due to the presence of a large amount of heavy metals in the oil. These metals can deposit on the catalyst surface during hydrotreatment, thereby to poison the catalyst and shorten its life sharply.

The catalytic hydrotreatment of heavy hydrocarbon oils by the known processes requires frequent renewal of the catalyst, and a heavy consumption of the catalyst relative to the oil to be treated. In the event the known process is selectively intended for decomposing asphaltenes to produce light oil, it is necessary to enhance the activity of the catalyst. This necessarily requires stringently selected conditions for the reaction so that the degradation of the catalyst is further promoted and the light oil produced undergoes cracking and gasification. This disables a high-yield production of light oil, and brings about a seriously uneconomical increase in the consumption of hydrogen.

Members of the group to which the inventors of this invention belong have been engaged in extensive research for several years with a view to finding out a catalyst which overcomes the aforementioned disadvantages of the known catalyst and which is effective for the catalytic hydrotreatment of heavy hydrocarbon oils. As a result, they have discovered that a sepiolite catalyst is particularly effective for the hydrotreatment of hydrocarbons, particularly for the removal of heavy metals therefrom. They have already obtained patent protection for a process for removing metals from hydrocarbons by using such a catalyst, and a process for preparing the catalyst (U.S. Pat. Nos. 4,152,250 and 4,196,102).

They have also discovered that clay minerals of the double-chain structure, including sepiolite, have a pore structure which is effective for the hydrotreatment of heavy hydrocarbon oils, and that a specific type of vanadium sulfide is active for the hydrotreatment of heavy hydrocarbon oils, particularly for the decomposition of asphaltenes and the removal of heavy metals therefrom. Based on this discovery, they have applied for a patent on a catalyst compound of such a clay mineral and vanadium sulfide for the hydrotreatment of heavy hydrocarbon oils, and a process for preparing such a catalyst (U.S. Ser. No. 84,764).

There have been many proposals which suggest addition of a second component into a solid oxide catalyst as a filler, diluent, dispersant, molding assistant or reinforcing agent, or the like (U.S. Pat. No. 3,118,845, British Pat. No. 1,218,080, Japanese Patent Publication No. 31878/1974, Japanese Laid-Open Patent Application Nos. 36595/1974, 40494/1975, 142492/1975 and 82690/1977, etc.). The aforementioned U.S. Pat. Nos. 4,152,250 and 4,196,102 also teach that it is effective to add an ordinary alumina sol as a molding assistant.

SUMMARY OF THE INVENTION

The present invention provides a catalyst for hydrotreating a heavy hydrocarbon oil, including a carrier which is a calcined composite of a mixture of a clay mineral consisting mainly of magnesium silicate having a double-chain structure and a pseudoboehmite which shows a powder X-ray diffraction spectrum obtained by applying a CuK$_\alpha$ ray such that the half value width of the peak on the (020) plane is between about 0.8° and 4.0° and the intensity of said peak is between 1.2 and 8.0 times as high as that at $2\theta = 10°$, and at least one catalytic metal component composited with the carrier, the metal of said catalytic metal component being selected from the group consisting of metals belonging to Groups VB, VIB, VIII and IB of the Periodic Table. For the purpose of this specification, the Periodic Table is one appearing on page 628 of Webster's Seventh New Collegiate Dictionary, G & C Merriam Company, Springfield, Mass. (1965).

The catalyst of this invention exhibits an extremely improved activity for the decomposition of asphaltenes, removal of vanadium and desulfurization over a catalyst containing no such pseudoboehmite. It has been found out that if the amount of the pseudoboehmite is maintained within a specific range, the activity of the catalyst can be surprisingly improved without impairing the porous structure of the clay mineral which is effective for the selective decomposition of asphaltenes. It has been further ascertained that the activity of such a catalyst is not substantially reduced by the deposition of the heavy metals contained in the heavy hydrocarbon oils, but can be maintained unchanged for a long period of time.

In another aspect of this invention there is provided a method of preparing such a catalyst. The present invention also provides a process for hydrotreating heavy hydrocarbon oils by using such a catalyst.

It is, therefore, an object of the present invention to provide a novel catalyst which is effective for hydrotreating an asphaltene-containing heavy hydrocarbon oil, especially in decomposing asphaltenes and concomitantly removing heavy metals therefrom.

Another object of this invention is to provide a catalyst which is devoid of the afore-mentioned drawbacks of the conventional catalysts and which can exhibit a high degree of activity for a long period of time.

A further object of this invention is to provide a simple and economically acceptable method by which a catalyst suitable for hydrotreating asphaltene-containing heavy oils can be obtained.

It is yet a further object of this invention to provide a process for hydrotreating a heavy hydrocarbon oil, especially an oil containing large amounts of asphaltenes and heavy metals, by which such an oil can be effectively converted into a substantially asphaltene-free and heavy metal-free light oil.

BRIEF DESCRIPTION OF THE DRAWINGS

Other objects, features and advantages of this invention will become apparent from the detailed description of the invention which follows, when considered in light of the accompanying drawings in which:

FIGS. 1 to 6 show the X-ray diffraction spectra of different types of pseudoboehmite;

FIGS. 7 and 8 are electron microphotographs showing the structures of different types of carriers;

DETAILED DESCRIPTION OF THE INVENTION

The novel catalyst of this invention is comprised of a specific carrier which is a calcined composite of a mixture of a clay mineral containing magnesium silicate of the double-chain structure as a main component and a specific type of pseudoboehmite. At least one catalytic metal component is composited with the carrier to form the catalyst of this invention. The catalyst has a porous structure suitable for effectively hydrotreating heavy hydrocarbon oils and has a remarkably improved specific activity per unit surface area.

Although the reason for the high activity of the catalyst according to this invention has not yet been fully analyzed, it is understood from the qualitative standpoint that the pseudoboehmite uniformly dispersed in the clay mineral forms a layer of appropriately grown crystals of activated $\gamma$-alumina on the catalyst surface when it is calcined, whereby the dispersion of the catalytic metal component on the catalyst surface is promoted, and the chemical nature of the catalyst surface is improved resulting in the development of a novel catalytic action created by the cooperation of the clay mineral, the activated $\gamma$-alumina and the metal, and which is different from the effect obtained by any known catalyst composed solely of a clay mineral and a metal.

Pseudoboehmite is composed of fine fibrous crystals defining a crystal lattice typically having a diameter of 20 to 50 Å and a length of about 100 to 900 Å. The properties of pseudoboehmite, its crystal structure and degree of crystallinity, and the size of its individual crystals can be determined by X-ray diffraction. For the purpose of this invention, X-ray diffraction has been employed for determining the most suitable pseudoboehmite to be incorporated in the clay mineral of the double-chain structure. For details concerning the general properties of pseudoboehmite and its X-ray spectrum, reference is made to a paper by Yamaguchi in Chemistry and Industry, Vol. 17, No. 12, pages 1326 to 1335, and a paper by Ono in Chemical Industry, April 1968, pages 354 to 363.

For the purpose of this invention, X-ray spectra of pseudoboehmite were obtained under the following conditions:

(1) An X-ray tube having a paired copper cathode, and operating with a 35 kV, 20 mA filament current was used together with a 1° divergency slit, a 0.15 mm receiving slit, and a goniometer having a graphite monochromator for removing $CuK_\alpha$ rays;

(2) a scintillation counter composed of NaI(Tl) luminous crystals was used as a detector; and (3) the detector was operated at a scanning speed of 2° ($2\theta$) per minute, and output signals were recorded on a recorder having a strip of recording paper traveling at a speed of 2 cm per minute in accordance with a scale factor set with a full scale of 400 counts per second.

Figure 2:
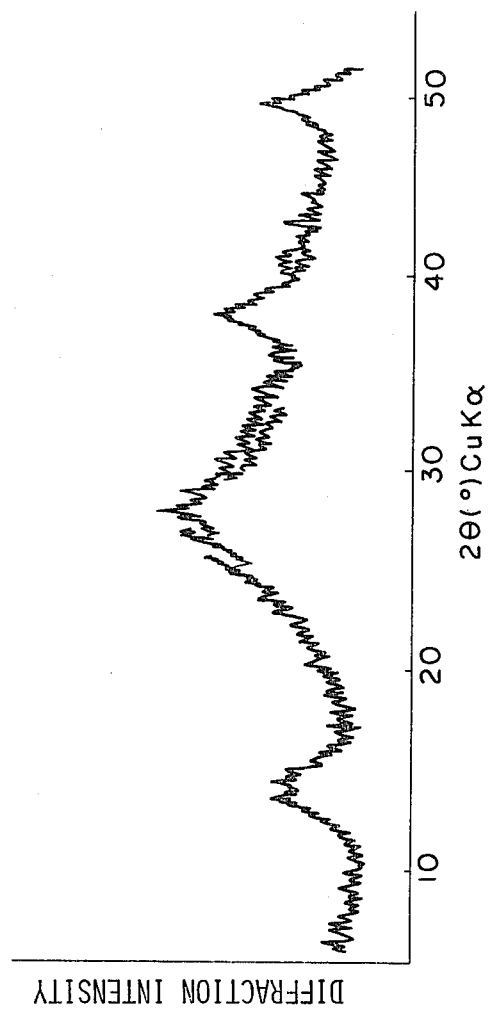
Figure 3:
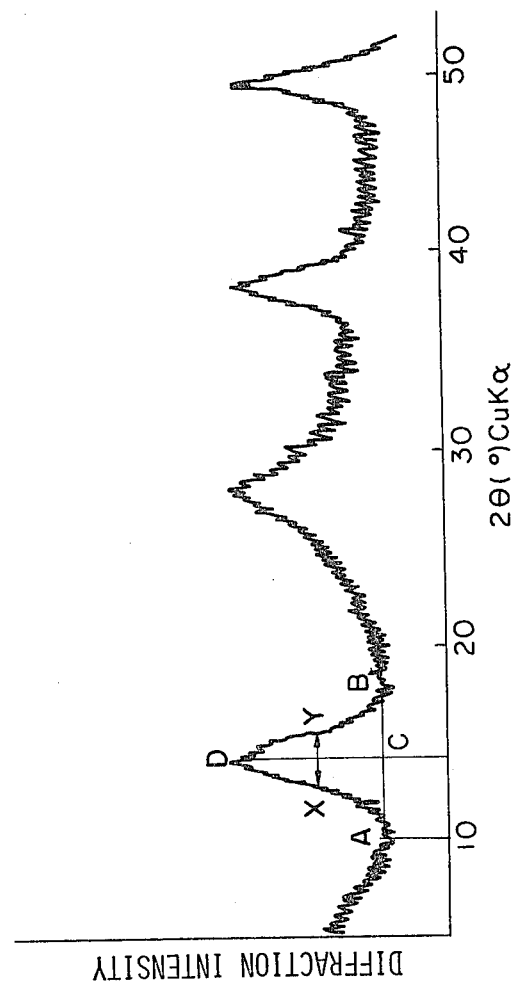
Figure 4:
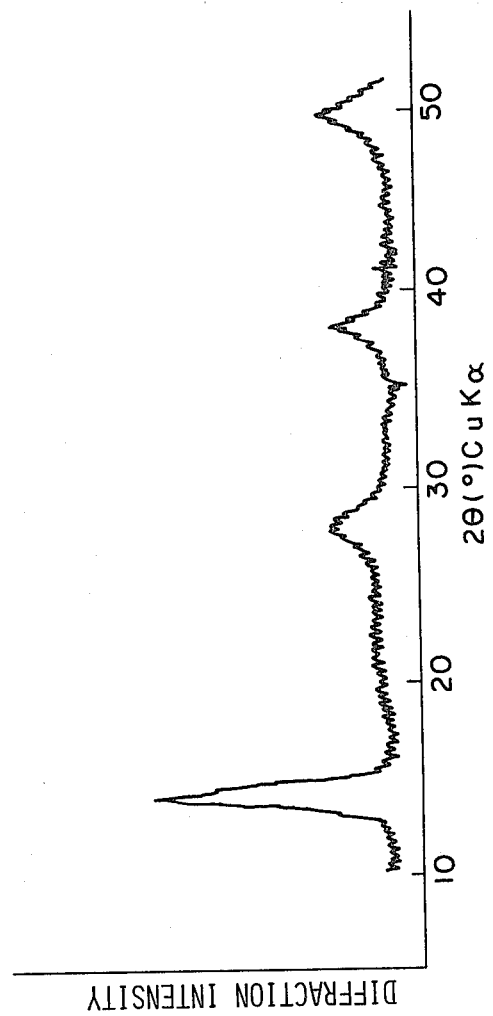

FIGS. 1 to 6 show the X-ray diffraction spectra of several types of pseudoboehmite as obtained in accordance with the aforementioned conditions, from which it will be appreciated that there exist significant differences in the crystal structures. The inventors of this invention have discovered that those types of pseudoboehmite of which the X-ray diffraction spectra as shown in FIGS. 2 to 4 are particularly effective for the purpose of this invention, while the other types are of little or no use. Thus, the pseudoboehmite used in the production of the catalyst of this invention should meet with the following specific requirements with respect to its X-ray diffraction spectrum. A first requirement is related to the half value width (or half width) of the peak on the (020) plane, i.e. at $2\theta$=about 14°, while a second requirement concerns the ratio between the intensity at $2\theta$=about 14° and that at $2\theta$=about 10°.

The half width of the peak of the (020) plane at $2\theta$=about 14° is a value exemplified by a line between the points X and Y in FIG. 3. The line X-Y extends through the mid-point of a segment C-D, in which C stands for the intersection between a line connecting the point A of intensity at $2\theta$=about 10° and the point B of intensity at $2\theta$=about 18°, and a perpendicular line depending from the point D of the maximum intensity. In the particular diffraction spectra shown in FIGS. 1 to 6, the half widths on the (020) plane at $2\theta$=about 14° are about 4.5°, 3.5°, 2.6°, 0.8°, 0.8° and 0.7°, respectively. The half widths have been found to correspond to the sizes of the fine crystals of pseudoboehmite, i.e. the fine crystal size decreases with an increase in the half width. It has been revealed that the optimum range of the half width is from about 0.8° to about 4.0° for the purpose of this invention.

The ratio of the peak intensity at $2\theta$=about 14° to that at $2\theta$=about 10° may be deemed as an index showing the crystallinity of pseudoboehmite, and the size and shape of the particles formed by its fine crystals. The X-ray diffraction intensity of pseudoboehmite at an angle $2\theta$ of about 10° is affected by the nature and intensity of the small-angle X-ray scattering on the side of a smaller angle than that. The small-angle scattering is related to the presence of matter in the form of small particles, hence the heterogeneity of the scattering medium. Extension of the small-angle scattering to a still greater angle indicates the presence of still smaller particles, or further disorder or heterogeneity of the lattice. The scattering is in fact not related to the crystallinity of the sample or the short-range regular arrangement of atoms containing particles, nor is it affected by any deformation of the crystal lattice, but it merely depends on the shape and dimensions of the particles. The X-ray diffraction intensity of pseudoboehmite at an angle $2\theta$ of about 14° is related to its crystallinity, and its increase indicates a higher degree of crystallinity.

The inventors of this invention have examined the ratio of the intensity at an angle $2\theta$ of about 14° to that at about 10°, and found that for the purpose of this invention, an effective value of the former intensity is about 1.2 to about 8.0 times greater than the latter intensity. In FIGS. 1 to 6, the ratios between the values of such intensity are about 1.1, 2.5, 3.3, 8.0, 14.0 and 16.0, respectively.

Figure 5:
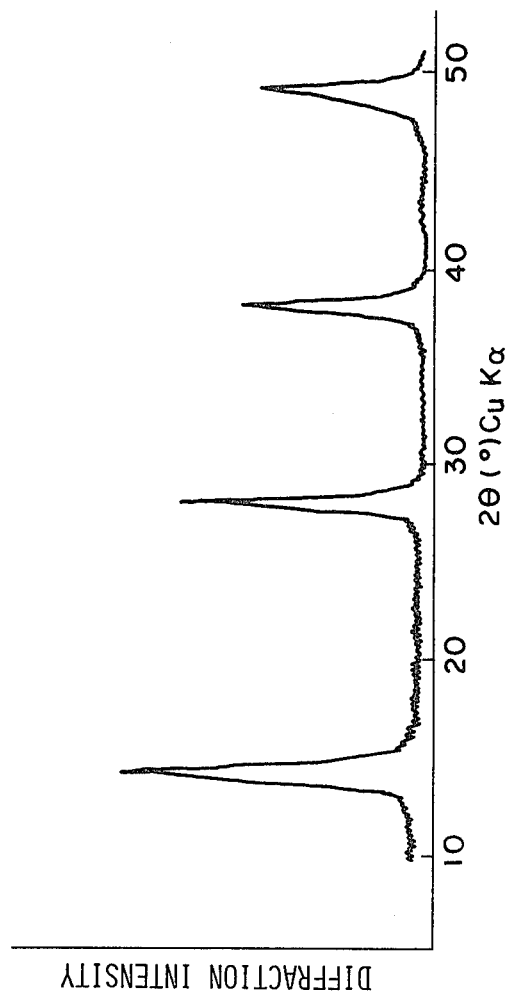

It is, thus, noted that those types of pseudoboehmite of which the X-ray diffraction spectra are shown in FIGS. 2 to 4 satisfy both the requirement that the half width of the peak on the (020) plane at an angle $2\theta$ of about 14° be within the range of 0.8° to 4.0°, and the requirement that the peak intensity at about 14° be about 1.2 to 8.0 times greater than the strength at 10°. The pseudoboehmite of which the X-ray diffraction spectrum is shown in FIG. 5 satisfies the first requirement, but does not satisfy the second requirement.

The type of pseudoboehmite to be employed has a significant bearing on the nature of the carrier formed from a clay mineral consisting mainly of magnesium silicate of the double-chain structure and pseudoboehmite. The difference is manifested by the structure of the carrier observed through an electron microscope. For example, FIG. 7 is an electron microphotograph showing the structure of a precursor (uncalcined mass) for the carrier composed of sepiolite, and the pseudoboehmite of which the X-ray diffraction spectrum is shown in FIG. 1. As is obvious from the photograph, very fine particles of the pseudoboehmite shown at a in FIG. 7 closely fill the interstices between the fibers of sepiolite shown at b. When this precursor is dried and calcined, a high degree of shrinkage developed by its dehydration forces the sepiolite fibers to be oriented or cohere. This orientation or cohesion has an adverse effect on the porous structure of the catalyst. FIG. 8 is an electron microphotograph showing a carrier prepared by using the pseudoboehmite of which the X-ray diffraction spectrum is shown in FIG. 3. As shown therein, the pseudoboehmite particles c form coarsely cohering masses and are uniformly scattered or dispersed among the sepiolite fibers b. The examination in this way through an electron microscope indicates the desirability of the pseudoboehmite particles being oriented in various, non-specific directions, adhering closely to one another, and forming coarsely cohering masses having a dimension of about 1,000 to 3,000 Å. When such type of pseudoboehmite was calcined at about 300° C. to 800° C. for three hours, the resulting $\gamma$-alumina had a specific surface area of about 100 to 500 m$^2$/g which was satisfactory for the catalyst of this invention. It is desirable to use an appropriate amount of the pseudoboehmite in forming a precursor for the carrier with a clay mineral. If too large an amount of the pseudoboehmite is incorporated, the catalyst to be eventually obtained fails to retain the desirable porous structure of the precursor, and its porous structure is governed by that of the alumina formed by the pseudoboehmite.

It has been revealed that the combination of the clay mineral and pseudoboehmite improves chemical properties of the resulting catalyst on the surface thereof. The inventors of this invention determined the acidity of the catalyst surface in terms of the amount of ammonia adsorption based on the thermal desorption method [Y. Amenomiya, J. Catal. 46, 326 (1977)].

Several samples of the catalyst formed from sepiolite and pseudoboehmite, of which the X-ray diffraction spectrum is shown in FIG. 3, were prepared, so that they might contain different quantities of the pseudoboehmite. The amount of ammonia adsorbed was measured for each of those samples.

The results were as summarized below:

| Sample No. | Content of pseudoboehmite in terms of Al$_2$O$_3$ (wt %) | Amount of ammonia adsorbed (m mol/g) |
| --- | --- | --- |
| X | 0 | 0.20 |
| VII | 23 | 0.30 |
| I | 47 | 0.42 |
| VIII | 65 | 0.44 |
| IX | 75 | 0.45 |

Each Sample Number appearing above is that of the catalyst in the corresponding Example which will be described later. The amount of ammonia adsorbed represents the amount of ammonia desorbed within the temperature range of 200° C. to 600° C., and is substantially equal to the acidity of the catalyst surface.

Figure 6:
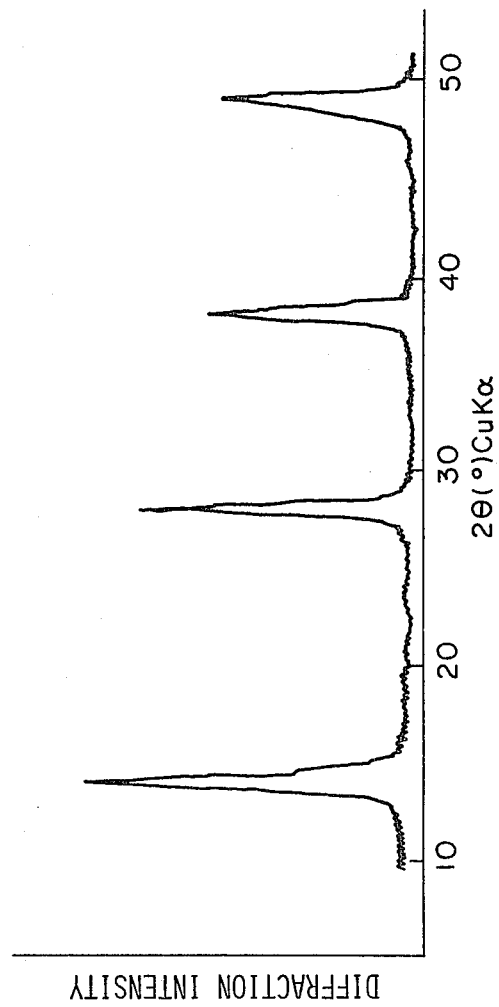

The test hereinabove described was repeated for samples of the catalyst containing the pseudoboehmite of which the X-ray diffraction spectrum was as shown in FIG. 6. The following results were obtained:

| Sample No. | Content of pseudoboehmite in terms of Al$_2$O$_3$ (wt %) | Amount of ammonia adsorbed (m mol/g) |
| --- | --- | --- |
| VI | 22 | 0.22 |
| II | 50 | 0.23 |

It is evident from the results shown above that the use of the pseudoboehmite satisfying the afore-mentioned requirements brings about a sharp increase in the acidity of the catalyst surface, while the pseudoboehmite failing to satisfy the requirements does not appreciably contribute to an increase in the amount of ammonia adsorbed, irrespective of the amount in which it is employed. It is particularly to be noted that the increase in the amount of the pseudoboehmite satisfying the requirements of this invention up to about 50% by weight in terms of alumina based on the weight of the clay mineral will bring about a sharp increase in the amount of ammonia adsorbed, and therefore, an effective increase in the acidity of the catalyst surface.

The increase in acidity leads directly to a remarkable improvement in the activity of the catalyst, apparently because the catalytic metal component can be more uniformly spread on the catalyst surface, and because the acidity of the catalyst surface can contribute directly to the reaction for the hydrotreatment of heavy oils. Since high molecular hydrocarbons, such as asphaltenes, are basic polycyclic aromatic compounds, the use of a catalyst having a high acidity is effective for the adsorption of the reactant.

Pseudoboehmite is converted into $\gamma$-alumina upon calcination, as described previously. It is desired that the amount of aluminum components formed from the pseudoboehmite is between 10 to 80%, preferably 15 and 65% in terms of $Al_2O_3$ based on the total weight of the catalyst. No appreciable improvement can be obtained in the activity of the catalyst with less than 10% by weight. An amount of the aluminum components derived from the pseudoboehmite above 80% by weight tends to disturb the effective porous structure of the clay mineral consisting mainly of magnesium silicate of the double-chain structure.

Preferred examples of the clay mineral are naturally available, porous magnesium silicate minerals called sepiolite, attapulgite and palygorskite. These clay minerals have a crystal form of the double-chain structure as shown in The Handbook of Clays (1967) compiled by The Japanese Society of Clays. They have a double-chain lattice structure which is basically a chain structure similar to that of amphibole, as opposed to the other clay minerals having a layer lattice structure. The crystals of attapulgite have a fibrous form. Sepiolite is classified into $\alpha$-sepiolite composed of fibrous and tubular crystals and $\beta$-sepiolite composed of irregular flaky crystals. Naturally available sepiolite is often composed of a mixture of these two types of sepiolite. Palygorskite is similar to attapulgite, but is generally formed hydrothermally, while attapulgite is a mineral produced in deposits and having a low degree of crystallinity. Both palygorskite and attapulgite belong to the sepiolite-paramontmorillonite group.

Naturally available minerals named above have different chemical compositions according to the place where they are produced, but generally, their compositions fall within the following ranges. For the purpose of this invention, the clay mineral consisting mainly of magnesium silicate of the double-chain structure may be sepiolite containing 46 to 53% by weight of $SiO_2$, 0.6 to 8% by weight of $Al_2O_3$, 0.7 to 22% by weight of $Fe_2O_3$, 0.7 to 3% by weight of FeO, 12 to 23% by weight of MgO, 0.5 to 1% by weight of CaO, 8 to 13% by weight of $H_2O$ (+) and 8 to 11% by weight of $H_2O$ (−); attapulgite containing 53 to 58% by weight of $SiO_2$, 8 to 11% by weight of $Al_2O_3$, 2 to 4% by weight of $Fe_2O_3$, 0.2% by weight or less of FeO, 8 to 11% by weight of MgO, 1 to 2% by weight of CaO, 0.3% by weight or less of $K_2O$, 1% by weight or less of $Na_2O$, 8 to 12% by weight of $H_2O$ (+) and 8 and 10% by weight of $H_2O$ (−); or palygorskite containing 52 to 62% by weight of $SiO_2$, 6 to 19% by weight of $Al_2O_3$, 0.8 to 4% by weight of $Fe_2O_3$, 0.2 to 0.8% by weight of FeO, 5 to 15% by weight of MgO, 0.1 to 3% by weight of CaO, 10 to 14% by weight of $H_2O$ (+) and 6 to 11% by weight of $H_2O$ (−). They can be used individually or in the form of an appropriate mixture. Each value of $H_2O$ (−) indicates a reduction in the weight of the sample dried at a temperature of 105° C. to 110° C., while each $H_2O$ (+) value shows a difference between $H_2O$ (−) and a reduction in weight caused by soaking.

When they exist in nature, all of these minerals often have a part of magnesium replaced by a divalent or trivalent metal, such as Fe, Cr, Mn and Cu, or contain impurities, such as dolomite or other clay minerals, or amorphous silica, silica alumina and silica magnesia.

Each of the aforementioned clay minerals has a unique physical structure which is attributable to its own crystal structure. For example, sepiolite produced in Spain is a clay mineral containing a considerably large amount of fibrous crystals, and having a surface area of 150 to 200 $m^2/g$ and a pore volume of 0.3 to 1.0 cc/g, and Korean sepiolite is an asbestos-like mineral composed virtually wholly of fibrous crystals, and having a surface area of 50 to 400 $m^2/g$ and a pore volume of 0.3 to 3.0 cc/g. Japanese sepiolite produced in Akan, Hokkaido has a considerably great part of magnesium replaced by Fe, and has a surface area of 150 $m^2/g$ and a pore volume of 0.9 cc/g.

An adsorbent sold by Engelhard under the name of Sol Speedi Dri is a kind of attapulgite available in nature, and a clay-like material having a surface area of 120 $m^2/g$ and a pore volume of 0.5 cc/g. Palygorskite produced in Syria is a powder having a surface area of 120 $m^2/g$ and a pore volume of 0.6 cc/g. These clay minerals which are naturally available are somewhat different from one another in physical properties, and the form in which they exist, but all of them are porous, and contain a lot of fibrous crystals when examined through an electron microscope. The powder X-ray diffraction of these natural clay minerals indicates that their degrees of crystallinity widely differ and lie over a wide range.

According to a very important aspect of this invention, the catalyst prepared by commingling such a clay mineral with pseudoboehmite almost completely retains the pore volume of the clay mineral as required of the carrier, and has a higher activity than a catalyst having a carrier composed solely of a clay mineral.

The aforementioned specific types of pseudoboehmite which are useful for the purpose of this invention may be prepared by a known process as, for example, disclosed in U.S. Pat. Nos. 3,188,174, 3,222,273, 3,846,285 or 732,650, or Japanese Patent Publication Nos. 12397/1975, 50201/1978 or 120691/1978. It is, however, particularly desirable to use the process disclosed in Japanese Patent Application No. 98725/1978 (Laid-Open No. 27830/1980). According to the process shown therein, an alkali is added into an aqueous solution of a strong acid salt of aluminum, such as aluminum nitrate, chloride or sulfate, or an acid or a strong acid salt of aluminum is added into an aqueous solution of sodium or potassium aluminate, whereby a slurry containing a seed aluminum hydroxide hydrosol is formed. The slurry is adjusted to pH 6 to 10, and maintained at a temperature of at least 50° C. 2 to 200 mol% of an aluminum compound, such as aluminum nitrate, chloride or sulfate, and sodium or potassium aluminate, is then added into the slurry based on the aluminum hydroxide therein so as to change the pH of the slurry to 5 or below, or 11 or above, whereby fine crystallites of the aluminum hydroxide are dissolved. Then, a neutralizing agent is added to restore the slurry to pH 6 to 10, whereby hydrated aluminum crystallites are allowed to grow. These procedures are repeated a plurality of times to form a coarsely coagulated mass of hydrogel particles, i.e. the alternately repeated addition of the aluminum salt and the neutralizing agent causes grown pseudoboehmite particles to cohere and form a coarsely coagulated mass sized approximately at 1,000 to 3,000 Å. The resulting hydrogel is preferably aged and washed, and then dehydrated to give pseudoboehmite.

The catalytic metal component of the catalyst according to this invention comprises at least one transition metal selected from among the elements of Groups VB, VIB, VIII and IB of the Periodic Table, preferably vanadium, molybdenum, tungsten, chromium, cobalt, nickel or copper. The metal component may be a metal itself, or an oxide or sulfide of a metal. Alternatively, a part of the metal component may be combined with the carrier by ion exchange.

The amount of the catalytic metal component in the catalyst is preferably in the range of about 0.1 to about 20% by weight in terms of the elemental metal. The catalytic metal component governs the activity of the catalyst for various reactions involved in the hydrotreatment of heavy hydrocarbon oils, such as decomposition of asphaltenes, removal of heavy metals, desulfurization and denitrification. The selection of the catalytic metal component and the combination of metals, if a plurality of metals are employed, depend on the type of the reaction which is considered most important on a case to case basis. For example, if the catalyst is intended for use particularly in the decomposition of asphaltenes and the removal of heavy metals from heavy hydrocarbon oils, it is effective to use such a metal as vanadium, molybdenum and copper, or a combination thereof with at least one of cobalt, nickel, tungsten and chromium. If it is additionally desired to promote the activity of the catalyst for desulfurization, it is desirable to use such a combination of metals as cobalt and molybdenum; nickel, cobalt and molybdenum; vanadium, cobalt and molybdenum; and vanadium, nickel, cobalt and molybdenum.

The preferred quantities of the metals in the catalyst depend on the kinds and combination of the metals employed. Referring to a combination of cobalt and molybdenum by way of example, the catalyst should preferably contain about 0.1 to 5% by weight of cobalt and about 2 to 15% by weight of molybdenum.

If the hydrotreatment of heavy hydrocarbon oils is further intended for denitrification and reduction of the Conradson carbon residue, it is effective to incorporate, as auxiliary component, boron and/or phosphorous in addition to the aforementioned catalytic metal components. It is desirable to employ about 0.2 to 4% by weight of boron and/or phosphorous in terms of the elemental weight.

The porous structure of the catalyst has a significant bearing on its activity and life, and plays an important role in the effective hydrotreating of heavy hydrocarbon oils. The catalyst of this invention has a physical structure which is suitable for easy diffusion of high molecular hydrocarbon fractions, such as asphaltenes, into the active sites in the pores of the catalyst. The catalyst is required to have a pore volume capable of holding a sufficient amount of metal for a reasonable catalyst life, but if the pore volume is too large, the catalyst has a low bulk density, a low activity per unit volume which it fills, and a low mechanical strength.

Therefore, the pore volume of the catalyst is preferably maintained in the range of about 0.5 to 2.0 cc/g. The catalyst is required to have a pore diameter which is sufficiently large to permit easy diffusion of macromolecules, such as asphaltenes, into the pores, but as too large a diameter reduces the surface area of the catalyst and lowers its activity, it is desirable to maintain the pore diameter within the range of about 100 to about 500 Å. It is desired that the catalyst have a surface area of about 40 to 400 $m^2/g$ defined by pores having a diameter of at least 100 Å.

Thus, it is preferred that the catalyst of this invention have the following physical properties:

(1) The catalyst has an average diametrical breaking strength of at least 1 kg/5 mm;
(2) Its bulk density is between about 0.2 g/cc and about 1 g/cc;
(3) Its pore volume is between about 0.5 and about 2 cc/g;
(4) The catalyst has an average pore diameter of between about 100 and about 500 Å; and
(5) The pores having a diameter of at least 100 Å occupies a surface area of between about 40 and about 400 $m^2/g$. The various values given above are directed to the catalyst which has been calcined and is ready for use.

For the purpose of this specification, the pore volume, average pore diameter and surface area of the catalyst were determined by a mercury penetration method using a porosimeter, model 70 made by Carlo Erba, Milano, Italy at a contact angle of 140°, a maximum mercury pressure of 2,000 $kg/cm^2$ and a mercury surface tension of 474 dyne/cm at 25° C. The pore volume and average pore diameter were measured with regard to pores having a diameter of at least 75 Å.

The novel catalyst of this invention can be prepared by a method which includes the steps of (a) commingling the above-described pseudoboehmite with the above-described clay mineral in the presence of water to obtain a mixture having a water content of between 40 and 80% by weight; (b) molding the mixture into a desired shape; (c) supporting a catalytic component on the mixture; and (d) calcining the mixture.

The clay mineral may be pretreated before the commingling step, if necessary. Suitable pretreatment includes heat treatment, grinding treatment and/or chemical treatment. The heat treatment comprises heating the clay mineral for drying and in some cases for decomposing impurities contained therein. Grinding of the clay mineral is generally conducted by either a wet or dry method so as to pulverizing into a particle size of 50 mesh or finer. Chemical treatment is conducted to remove impurities such as silica and includes washing the clay mineral with an acidic or alkaline aqueous solution. Treatment of the clay mineral with an aqueous solution of sodium carbonate or sodium chloride is also effective to deactivate calcium ion by converting it into sodium ion.

The commingling (step (a)) may be preferably performed by kneading a mixture of the clay mineral, the pseudoboehmite and water by means of an ordinary kneader machine. The pseudoboehmite is added into the clay mineral in such an amount that the catalyst ultimately produced may contain 10 to 80% by weight of aluminum components derived from the pseudoboehmite in terms of $Al_2O_3$. The water content in the mixture is maintained at about 40 to 80% by weight.

Step (a) may also be carried out by the following way. At least about three times as much water is added into the clay mineral, and the mineral and the water are thoroughly mixed by means of a paddle type agitator, homogenizer, colloid mill or the like. A predetermined quantity of the pseudoboehmite is added into the mixture before, during or after such agitation, whereby a pasty mixture in the form of a gel or sol is prepared. It is preferred that aqueous ammonia, sodium hydroxide, sodium aluminate, or the like be added into the mixture in order to control it to a pH range of 5 to 11. The mixture in the form of a gel refers to a milky and emulsified mixture which is highly viscous and has a very low fluidity, while the mixture in the form of a sol indicates a uniform dispersion having a high degree of fluidity. For the purpose of this invention, either form may be satisfactory, and it depends on the nature of the starting materials, the amount of the water added and the method of agitation employed.

For the purpose of promoting the gelation or solution of the mixture, or improving the peptization of the fibrous clay mineral, it may be effective to heat the mixture, or treat it with ultrasonic waves, or add thereinto ammonium chloride, ammonium nitrate, ammonia, potassium hydroxide, or a peptizing agent such as sodium hexametaphosphate known under the trade name of Calgon, sodium pyrophosphate and sodium silicate. The mixture in the form of a gel or sol is formed into a cake having a water content of about 40 to 80% by weight by drying, or by atmospheric, vacuum or pressure filtration, or centrifugal separation, or the like methods.

The kneaded or mixed product prepared as described above has its water content adjusted to about 40 to 80% by weight, and is then extrusion or granulation molded (step b). The extrusion molded product may be columnar or hollow cylindrical, or may have a cross section which is non-circular, for example, oval or multilobed, such as trilobate. The granulation molded product may be formed by an appropriate method, such as by prilling, dropping in oil, and wet granulation.

The molded product from step (b) is dried at a temperature of about 100° C. to 200° C. for about 0.5 to 24 hours until its solid content becomes at least about 25% by weight, and then, it is calcined at a temperature of 200° C. to 800° C. for about 0.5 to 10 hours (step d). Before it is so dried, the molded product may sometimes be allowed to stand at room temperature for at least one whole day and night. It is, thus, possible to form a calcined molded product having a pore volume of about 0.5 to 2.0 cc/g, an average pore diameter of about 100 to 500 Å and a surface area of about 40 to 400 m$^2$/g defined by pores having a diameter of at least 100 Å, if various factors are appropriately selected, including the degree to which the clay mineral and pseudoboehmite are kneaded or mixed, the pH of the mixture, the amount of water which it contains when molded, and the temperature, rate and time at or for which it is dried or calcined.

Supporting the above-described catalytic metal component on the carrier formed from the clay mineral and pseudoboehmite (step (c)) can be carried out either concurrently with step (a) or after step (b). The same is true of the auxiliary components, such as boron and phosphorous. The catalytic metal component defining a source of activity for the catalyst according to this invention may be prepared from any known starting material by any known method, if a predetermined quantity of such material can be uniformly distributed in the catalyst.

The starting material may be an individual element, or a compound containing two or more elements, and may be prepared by any known method that is appropriate for the material. Specific examples of the material include molybdenum compounds such as oxides (e.g., $MoO_3$ and $MoO_2$), molybdic acid and its salts [e.g., $H_2MoO_4$, $H_2MoO_3 \cdot H_2O$, $(NH_4)_2Mo_7O_{24}$, $(NH_4)_2MoO_4$], and chlorides (e.g., $MoCl_3$ and $MoCl_4$); and cobalt compounds such as oxides (e.g., $CoO$, $Co_2O_3$, $CoO_2$ and $Co_3O_4$), cobalt salts [e.g., $CoCl_2$, $CoCl_2 \cdot 6H_2O$, $Co(NO_3)_2 \cdot 6H_2O$, $CoSO_4 \cdot 7H_2O$, $Co(CH_3CO_2)_2 \cdot 4H_2O$ and $CoC_2O_4 \cdot 2H_2O$], cobalt hydroxide $[Co(OH)_2]$, and cobalt carbonate (basic cobalt carbonate.

If nickel is to be incorporated, it is possible to employ nickel oxide (NiO), nickel salts such as $NiCl_2$, $NiBr_2$, $NiI_2$ and its hydrate, $Ni(NO_3)_2 \cdot 6H_2O$, $NiSO_4 \cdot 6H_2O$, $Ni(CH_3CO_2)_2 \cdot 4H_2O$ and $NiC_2O_4 \cdot 2H_2O$, nickel hydroxide $[Ni(OH)_2]$, nickel carbonate, or nickel acetylacetonate. Tungsten may be incorporated in the form of oxides such as $WO_3$ and $WO_2$, tungstic acid and its salts such as ammonium tungstate, paratungstate or metatungstate, or the like. Copper is usually added in the form of copper nitrate, copper chloride, copper acetate, or copper sulfate.

A catalyst carrying a predetermined quantity of cobalt and molybdenum, for example, may be prepared by immersing the product from step (b), after drying and, if necessary, precalcining, in an ammoniacal aqueous solution containing both cobalt nitrate and ammonium molybdate followed by drying and calcining. It is also possible, however, to employ any other method well known to anybody of ordinary skill in the art, such as mixing, impregnation, kneading and ion exchange. Whichever method may be employed, there is virtually no difference in the performance of the catalyst if it carries or contains a predetermined quantity of the metal component. Some catalysts may contain a negligibly small amount of a metal salt, depending on the clay mineral employed, and the process used for preparing the catalyst. It is, however, so small that the power of the catalyst is not appreciably affected by any such foreign matter.

A catalyst carrying vanadium may, for example, be prepared by the process disclosed by the inventors of this invention in Japanese Patent Application No. 125689/1978 (Laid-Open No. 54036/1980), or U.S. Ser. No. 84,764. According to this process, a calcined product from step (d), which may carry other catalytic metal components than a vanadium component, is brought in the presence of hydrogen into contact with a heavy hydrocarbon oil containing large quantities of vanadium and sulfur, whereby vanadium and sulfur are released to form a layer of vanadium sulfide ($VS_x$) deposited on the carrier surface. The heavy hydrocarbon oil may be more effective if it contains more vanadium. Specifically, it is desirable to use a hydrocarbon oil containing at least 200 ppm, and preferably at least 400 ppm, of vanadium. The deposition of $VS_x$ may be carried out at a temperature of 350° C. to 450° C., preferably 390° C. to 420° C., and a hydrogen pressure of 30 to 250 atmospheres, preferably 80 to 160 atmospheres.

A catalyst carrying vanadium can also be prepared by bringing the product from step (b), after drying and, if necessary, precalcining, into a non-oily, non-hydrocarbon or polar medium containing a soluble vanadium compound, followed by appropriate sulfurization. The term "non-oily medium" means, for example, an aqueous or alcoholic solution. Examples of the soluble vanadium compound include vanadyl oxalate, vanadyl sulfate, ammonium metavanadate, acetylacetone vanadium and vanadium oxide. These vanadium compounds are often hardly soluble in water or the like, and therefore, the medium should preferably be heated, or made acidic or alkaline to improve the solubility of the compound therein. The solubility of ammonium metavanadate in water is as low as 0.52 g/100 g at 15° C. and 6.95 g/100 g at 96° C., in the vicinity of which its decomposition takes place. It is, therefore, preferable to add oxalic acid in order to improve the solubility of ammonium metavanadate and its adhesion to the clay mineral and pseudoboehmite composition.

Boron or phosphorous may be incorporated in a customary manner in order to promote the activity of the catalyst for a specific kind of reaction. Boron may be incorporated in the form of orthoboric acid, metaboric acid, ammonium metaborate, or the like. Phosphorous may be incorporated in the form of its oxide ($P_2O_5$), phosphoric acid or its salts such as orthophosphoric acid, metaphosphoric acid, pyrophosphoric acid and ammonium phosphate, or the like. These compounds may be incorporated simultaneously with the aforementioned metal component, or before or after it is supported. In other words, it is possible to use a starting material containing two or more elements forming the catalyst, such as titanium phosphate, phosphotungstic acid, phosphomolybdic acid and ammonium phosphomolybdate.

The aforementioned metal component, boron and phosphorous can be incorporated into the catalyst by various known methods as, for example, disclosed in "The Handbook of Catalysts", Course of Catalytic Engineering 10, The Japanese Society of Catalysts, Chijin Shokan, Publishers (1967).

The catalyst of this invention is very effective for the hydrotreatment of heavy hydrocarbon oils, particularly the decomposition of asphaltenes, removal of heavy metals, desulfurization and denitrification. It is also suitable for reducing their Conradson carbon residue, lowering their specific gravity, viscosity and pour point, and hydrocracking them into light oils.

The catalytic hydrotreatment of heavy hydrocarbon oils using the catalyst of this invention can be preformed in an ordinary flow reaction system provided with a fixed, moving, fluidized or ebullated bed, without causing any catalyst to be carried forward with the reaction product out of the reaction zone, if the shape of the catalyst, and the like are appropriately selected. The term "heavy hydrocarbon oil" herein used is intended to mean a heavy crude oil, a reduced crude oil, a vacuum distillation residue, a crude oil extracted from tar sand, and a mixture thereof.

The hydrotreating of heavy hydrocarbon oils in the presence of the catalyst according to this invention may be carried out at a temperature of 350° C. to 450° C., preferably 390° C. to 420° C., a hydrogen pressure of 30 to 250 atmospheres, preferably 80 to 160 atmospheres, and a liquid space velocity of 0.1 to 10 $Hr^{-1}$, preferably 0.2 to 5 $Hr^{-1}$. The oil is treated in the presence of 100 to 2,000 volumes (100 to 2,000 Normal liters), preferably 500 to 1,000 Normal liters, of hydrogen or a gas rich in hydrogen at 15° C. per volume or liter of the oil at 15° C. at 1 atmosphere.

If the reaction temperature is lower than 350° C., the catalyst may fail to exhibit its activity fully and provide a practically acceptable degree of conversion during the hydrotreating operation. On the other hand, a reaction temperature exceeding 450° C. may give rise to active undesirable side reactions such as coking, and bring about reduction in the properties of the product oil and the activity of the catalyst.

A reaction pressure which is lower than 30 $kg/cm^2G$ leads to heavy coking which makes it very difficult to maintain the activity of the catalyst at the right level. A pressure exceeding 350 $kg/cm^2G$ causes heavy hydrocracking leading to an increased hydrogen consumption and a lower yield of the product oil, and also disadvantageously requires by far more expensive reactor and other related equipment. If the liquid space velocity is lower than 0.1 $Hr^{-1}$, the prolonged retention of the oil in the reaction area leads to degradation of its heavy fraction under heat, and reduction in the quality of the product oil, while a liquid space velocity exceeding $1-Hr^{-1}$ exhibits a rate of conversion per pass which is practically too low. A hydrogen to oil ratio below 100 Normal liters/liter brings about dificiency of hydrogen in the reaction zone and poor transfer of hydrogen into the liquid, resulting in a coking reaction which may have an adverse effect on the catalyst and the product oil. A hydrogen to oil ratio exceeding 2,000 Normal liters/liter does not bring about any obstacle to the reactions involved, but does not improve the process of this invention is any way. the cost of a compressor used for the circulation of hydrogen increases with an increase in the amount of hydrogen, and becomes particularly high for circulation of hydrogen at a flow rate exceeding 2,000 Normal liters/liter. Thus, the ratio of 2,000 Normal liters/liter defines a practically acceptable upper limit to the process of this invention.

If the aforementioned requirements are satisfied, it is possible to reduce asphaltenes and vanadium effectively from a heavy hydrocarbon oil containing large quantities of asphaltenes and vanadium, while simultaneously removing sulfur, nitrogen and residual carbon substantially.

The hydrotreating process of this invention is not only very effective for producing fuel oils or the like, but can also be effectively followed by the hydrodesulfurization, hydrocracking and catalystic cracking of the product oil, whereby a heavy hydrocarbon oil can be effectively converted into any desired final product. These combined processes will hereinafter be described by way of example.

Mode I—Combined Hydrotreating and Hydrodesulfurization

This combination is suitable for hydrotreating a heavy hydrocarbon oil containing large quantities of asphaltenes, vanadium, sulfur, etc. when a strict limitation is defined for the sulfur content of the product. The combined process may be used for producing ultrahigh grade fuel oils. Any known desulfurization process may be satisfactorily incorporated in the combination, using the same type of reaction system as used for hydrotreating as hereinbefore described.

The desulfurization is preferably carried out in the presence of a catalyst composed of at least one metal selected from among those belonging to Groups VB, VIB and VIII of the Periodic Table, and supported on a refractory inorganic oxide carrier. The kind and amount of the metal depend on the properties of the oil to be treated, and the properties of the metals. If metals of Groups VIII and VIB are, for example, employed, it is desirable to incorporate 1 to 10% by weight of the Group VIII metal in the form of its oxide and 4 to 15% by weight of the Group VIB metal. Particularly preferred metals are Co, Mo, Ti, Ni and V. any combination of these metals is satisfactory. They may be applied to the carrier by any customary method, such as immersion and spraying.

Suitable examples of the refractory inorganic oxide used for the carrier include alumina, silica, magnesia, boria, alumina-silica, alumina-magnesia, alumina-boria, silica-magnesia, silica-boria, magnesia-boria, alumina-silica-magnesia, alumina-silica-boria, alumina-magnesia-boria, and silica-magnesia-boria. Alumina and silica-alumina are particularly preferable.

The hydrodesulfurization process is carried out in the presence of the aforementioned catalyst at a temperature of 350° C. to 450° C., preferably 390° C. to 420° C., a hydrogen pressure of 30 to 250 kg/cm$^2$G, preferably 80 to 160 kg/cm$^2$G and a liquid space velocity of 0.1 to 5 Hr$^{-1}$, preferably 0.2 to 2 Hr$^{-1}$.

Mode II—Combined Hydrotreating and Hydrocracking

This combination is used for producing a product oil having a relatively wide range of applications, such as gasoline, lubricants and high grade fuel oils. For hydrocracking, it is satisfactory to use the same type of reaction system as used for hydrotreating or hydrodesulfurization.

The hydrocracking is preferably carried out in the presence of a solid acid catalyst composed of at least one transition metal, such as Cu and Ag belonging to Group IB of the Periodic Table, Cr, Mo and W of Group VIB, and Fe, Co, Ni, Ru, Rn, Pd, Os, Ir and Pt of Group VIII, supported on an amorphous carrier. Useful examples of the amorphous carrier include silica, alumina, magnesia, zirconia, titania and boria, and their mixtures, such as silica-alumina, silica-magnesia, silica-zirconia and silica-alumina-magnesia. Natural or synthetic clays are also useful as the carrier. The metal or metals are preferably applied in the form of their oxide or sulfide, or the mixture thereof on the amorphous carrier.

It is further effective to add an accelerator, such as phosphorous, boron and/or a halogen, particularly fluorine. Fluorine may be incorporated in the form of hydrogen fluoride, ammonium fluoride, or the like. The catalyst preferably contains 0.2 to 10% by weight of fluorine.

It is also effective to incorporate 3 to 25% by weight of zeolite (crystalline aluminosilicate) into the hydrocracking catalyst. It is particularly preferable to use decationized molecular sieves having a relatively uniform pore diameter of about 6 to 16 Å. It is possible to use zeolite of the hydrogen or ammonium type, or of the type which is ion exchanged with ions of a metal such as Ni, Co and Mo, or a rare earth element such as cerium and lanthanum. Crystalline zeolite molecular sieves, such as mordenite and faujasite, exhibit particularly superior effects.

The hydrocracking operation is performed at a reaction temperature of 280° C. to 450° C., preferably 330° C. to 400° C., a reaction pressure of 30 to 200 kg/cm$^2$G, preferably 70 to 170 kg/cm$^2$G and a liquid space velocity of 0.3 to 6 Hr$^{-1}$, preferably 0.5 to 2 Hr$^{-1}$, and with a hydrogen to oil ratio of 200 to 2,000 Normal liters (hydrogen)/liter (oil), preferably 500 to 1,000 Normal liters/liter.

Mode III—Combined Hydrotreating and Catalytic Cracking

This combination is particularly suitable for producing gasoline. Any known process is effectively applicable for the catalystic cracking operation.

Generally, a catalytic cracking system comprises a reaction zone for decomposing hydrocarbon oils and a zone for regenerating the catalyst, and the process includes the following steps:

(1) Contacting the hydrocarbon oil with an acid catalyst in the reaction zone to convert it into a lower boiling light hydrocarbon oil (gasoline fraction) and to precipitate carbonaceous matter (coke) on the catalyst;

(2) separating the lower boiling light hydrocarbon oil from the catalyst particles having coke or the like adhering thereto in a separator to recover the decomposition product which is substantially free from any such catalyst particle;

(3) recovering with steam volatile hydrocarbons entrained with the catalyst particles having coke or the like adhering thereto, in a stripping zone at the lower portion of the separator;

(4) transferring the catalyst particles having coke or the like adhering thereto from the separator to the regenerating zone to burn the coke away from the catalyst particles with a regenerating gas containing oxygen to thereby regenerate the catalyst; and (5) recycling the regenerated catalyst into the reaction zone, where it is contacted by a fresh charge of hydrocarbon oil.

Either a moving or a fluidized bed system may be used for carrying out the aforementioned steps of the catalytic cracking operation, through a fluidized bed system is preferred. The fluidized bed system may be either a thickened phase fluidized bed system having a thickened phase in the reaction zone in a reaction tower, or a riser transfer reactor having a riser provided with a dispersed catalyst phase. It is, of course, possible to combine these two systems.

The reaction zone is provided with any of various natural or synthesis metal oxide catalysts. Suitable examples of the catalyst include natural or synthesized, amorphous metal oxides, such as zeolite, silica-alumina, silica-magnesia, silica-zirconia, silica-titania, silica-thoria, silica-alumina-magnesia and silica-alumina-zirconia, natural clay minerals, such as kaolinite and montmorillonite, and natural clay. If any catalyst contains alumina, it is desirable that it contain 10 to 35% by weight of alumina.

It is effective to include a predetermined quantity of at least one kind of natural or synthesized zeolite type catalytic cracking catalyst. It is particularly effective to employ a natural or synthesized crystalline aluminosilicate known as faujasite, mordenite, chabazite, zeolite X or zeolite Y. As these types of zeolite contain a considerably large quantity of Na$_2$O, it is necessary to reduce the content of Na to, say, 1% or less in order to provide the catalyst with an effective activity for decomposition. For this purpose, it is desirable to exchange the ions of Na with those of rare earth elements, magnesium, ammonium, or the like.

The catalyst has an average particle diameter which depends on the system employed for the catalytic cracking operation. If a moving bed system is employed, it is desirable to use a catalyst having an average particle diameter of several millimeters. For a fluidized bed system, it is suitable to use a catalyst having an average particle diameter of 20 to 150 microns, preferably 40 to 80 microns.

The operation in the reaction zone is carried out at a reaction temperature of 400° C. to 600° C., preferably 450° C. to 530° C., and a reaction pressure ranging from the atmospheric pressure to 8 kg/cm²G, preferably up to 5 kg/cm²G. The length of time for which the catalyst stays in the reaction zone depends on the system employed for the operation. A period of 5 to 15 minutes is suitable for the catalyst to stay in the reaction zone for a moving bed system. A duration of 0.1 second to 15 minutes is preferred for the catalyst in a fluidized bed system. If a riser transfer reactor is employed, a shorter period of, say, 0.1 to 10 seconds is preferred.

As regards the proportion of the catalyst to the hydrocarbon oil to be treated, it is impossible to establish a single standard, since they contact each other in different ways from one reaction system to another. If a thickened phase fluidized bed is involved, it is preferable to adopt a liquid space velocity of 0.2 to 5.0 kg of hydrocarbon/kg of catalyst/hour, while a catalyst/hydrocarbon oil ratio of 1:1 to 30:1 by weight is desirable for a riser transfer reactor.

Then, steam is introduced for releasing volatile matter from the catalyst having coke or the like adhering thereto after it is separated from the reaction product from the reaction tower or riser of the reaction zone. This treatment is carried out at a temperature of about 400° to 580° C. The amount of the steam to be introduced depends on the amount of the volatile matter carried on the catalyst, the amount of the catalyst in the separator, and other factors. It is, however, desirable to base it on a speed at which gas rises through the separator, and a range of about 0.2 to 2.0 m/sec. is preferred.

The catalyst carrying coke thereon is transferred from the separator into the regenerating tower. It is preferable to maintain a thickened, fluidized layer in the regenerating tower. The catalyst is kept in the tower for about 3 to 20 minutes, and treated at a temperature of about 570° C. to about 730° C. This regenerating temperature should never exceed 790° C.; otherwise, the catalyst for the catalytic cracking operation might undergo undesirable changes in structure and composition, and lose its activity.

According to this invention, it is further possible to add antimony or the like into the catalyst in order to improve its resistance to contamination with metals as disclosed in Japanese Laid-Open Patent Application No. 68092/1977, or incorporate a noble or base metal into the catalyst in order to improve the efficiency with which carbon monoxide is oxidized into carbon dioxide during the regeneration of the catalyst.

Mode IV—Combined Hydrotreating, Hydrodesulfurization, Hydrocracking or Catalytic Cracking This combination is mainly used for the purpose of producing ultrahigh grade gasoline, or ultrahigh grade gasoline and lubricants. This combination is effectively applicable for the production of gasoline and lubricants from heavy oils having properties which are so bad that if the Mode II or III conbination is used, the individual processes are overloaded, and the catalyst has an unduly shortened life. The procedures described for the Mode I, II and III combinations may be repeated for the individual processes in the combination.

Figure 11:
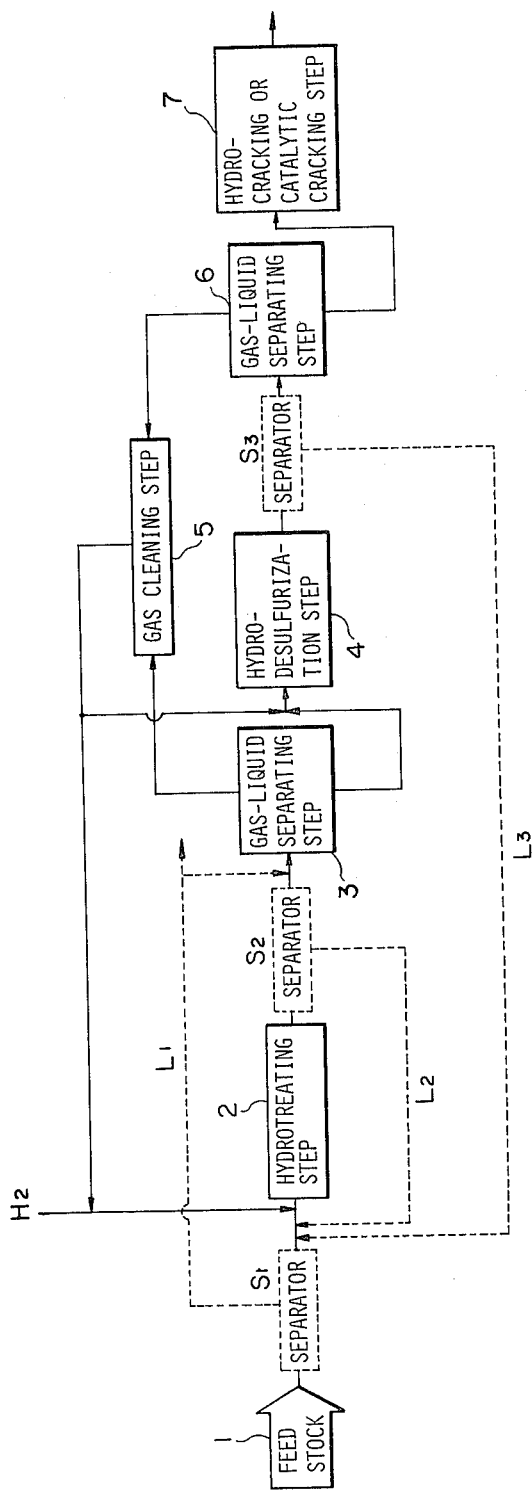
FIG. 11 is a flow sheet illustrating the combined hydrotreating process of this invention.

FIG. 11 illustrates a flow sheet exemplifying the processes involved in the Mode IV combination. The heavy hydrocarbon oil 1 to be treated is introduced into a hydrotreating step 2, and the hydrotreated oil is transferred into a gas-liquid separating step 3 in which the reaction product is separated into a liquid and a gas. The liquid reaction product is transferred into a hydrodesulfurization step 4, while the gaseous reaction product is introduced into a gas cleaning step 5. Under some conditions, it is, of course, possible to introduce the reaction product directly into the hydrodesulfurization step 4 without any gas-liquid separation. The oil is subjected to desulfurization and other related treatment in the hydrodesulfurization step 4, and then transferred into a hydrocracking (or catalytic cracking) step 7 directly or after gas-liquid separation in a gas-liquid separating step 6, whereby it is converted into ultrahigh grade gasoline, a lubricant, or the like.

According to another example of application of the Mode IV combination, the oil to be treated is introduced into a separator $S_1$, and separated into a light fraction and a heavy fraction. Then, only the heavy fraction is fed into the hydrotreating step 2, while the light fraction is transferred through a line $L_1$ into the desulfurization step 4 or the catalytic cracking (or hydrocracking) process 7. It is also effective to recycle the hydrotreated heavy fraction into the separator $S_1$.

According to another example of application, the hydrotreated heavy hydrocarbon oil is separated by a separator $S_2$ into a heavy fraction and a light fraction, and only the light fraction is introduced into the desulfurization step 4, while the heavy fraction is recycled into the hydrotreating step 2 through a line $L_2$. A further example comprises separating the hydrodesulfurized oil from the step 4 into a light fraction and a heavy fraction by a separator $S_3$, and transferring the light fraction into the catalytic cracking (or hydrocracking) step 7, while the heavy fraction is returned into the hydrotreating step 2 through a line $L_3$.

Although the aforementioned three examples of application have been based on Mode IV, they are also applicable to Mode I, II or III.

The invention will now be described with reference to examples. These examples are merely intended for describing the invention more specifically, and do never form any limitation to the scope of this invention.

EXAMPLE OF PREPARATION OF A CLAY MINERAL CONSISTING MAINLY OF MAGNESIUM SILICATE OF THE DOUBLE-CHAIN STRUCTURE

Clayey Spanish sepiolite ores and attapulgite sold by Engelhard, U.S.A. under the name of Sol Speedi Dri (SSD) were each dried with hot air at about 120° C. for six hours, and ground in a ball mill for about six hours, whereby a powder each of sepiolite and attapulgite having a particle size of about 50 mesh or finer was prepared. At least 90% of the particles has a particle size of 100 mesh or finer. Their chemical compositions were as shown in Table 1 below.

TABLE 1

| Chemical Composition (wt %) | Spanish Sepiolite | Attapulgite SSD (Engelhard) |
|---|---|---|
| $SiO_2$ | 59.8 | 58.0 |
| MgO | 25.9 | 8.0 |

TABLE 1-continued

| Chemical Composition (wt %) | Spanish Sepiolite | Attapulgite SSD (Engelhard) |
|---|---|---|
| $Al_2O_3$ | 2.6 | 9.3 |
| $Fe_2O_3$ | 0.7 | 3.0 |
| CaO | 0.5 | 2.0 |

Preparation of Pseudoboehmite A

Colloidal aluminum 200 sold by Nissan Chemical Industrial Co., Japan was provided as pseudoboehmite A. It contains about 10% by weight of pseudoboehmite in terms of $Al_2O_3$, and its X-ray diffraction spectrum is shown in FIG. 1. The X-ray diffraction chart indicates that the pseudoboehmite A is nearly amorphous pseudoboehmite.

Preparation of Pseudoboehmite B and C

An aqueous solution containing 76.6 g per liter of aluminum sulfate as $Al_2O_3$ was heated to and maintained at 95° C. 18 Liters of deionized water were placed in a vessel having an external heater, and heated to 95° C. 12 Liters of the aqueous aluminum sulfate solution were added into the vessel, and 4.4 liters of 28% aqueous ammonia were added thereinto quickly under vigorous stirring, whereby a slurry of a seed aluminum hydroxide hydrosol was prepared. This slurry was aged at pH 9 and 95° C. for 60 minutes with stirring.

Then, 2 liters of the aqueous aluminum sulfate solution were added into the slurry, whereupon the slurry had a sharply lowered viscosity and showed a pH value of 4. After five minutes, 0.8 liter of 28% aqueous ammonia was added into the slurry, whereupon it had an increased viscosity and showed a pH value of 9 again. The slurry was, then, stirred slowly at 95° C. for 20 minutes for aging. The alternate addition of the aqueous aluminum sulfate solution and of the aqueous ammonia was further continued four times more. Thereafter, the slurry was filtered, and the filtrate was washed until no sulfuric radical was detected. There was, thus, obtained a cake of pseudoboehmite B containing 20% by weight of pseudoboehmite in terms of alumina. The X-ray diffraction spectrum of the pseudoboehmite B is shown in FIG. 2.

The procedures hereinabove described were repeated except that the reaction temperature was changed to 100° C. The cake thus obtained was placed in the vessel again, and dispersed in 30 liters of deionized water at 100° C. Then, the alternate addition of the aqueous aluminum solution and of the aqueous ammonia was repeated seven times, whereby a slurry was obtained. The slurry was repeatedly filtered and washed until no sulfuric acid radical was detected in the filtrate to obtain a cake of pseudoboehmite C containing 20% by weight of pseudoboehmite in terms of alumina. The X-ray diffraction spectrum of the pseudoboehmite C is shown in FIG. 3.

Preparation of Pseudoboehmite D

Four liters of an aqueous solution containing 5% by weight of basic aluminum nitrate ($NO_3^-/Al=0.48$) in terms of $Al_2O_3$ were heated at 170° C. for three hours in a stainless steel autoclave, whereby a white boehmite slurry was obtained. The slurry was washed and filtered to yield about 840 g of pseudoboehmite D whose X-ray diffraction spectrum is shown in FIG. 4.

Preparation of Pseudoboehmite E and F

12 Liters of an aqueous solution containing 76.6 g per liter of aluminum sulfate as $Al_2O_3$ were diluted in 18 liters of deionized water, and 4.4 liters of 28% by weight aqueous ammonia were added thereinto under stirring, whereby a slurry of aluminum hydroxide was formed. The slurry was filtered and washed repeatedly until no sulfuric acid radical was detected in the filtrate, whereby a cake containing about 10% by weight of pseudoboehmite in terms of $Al_2O_3$ was formed. This cake was dispersed again in 20 liters of deionized water, and treated hydrothermally at 150° C. for an hour in an autoclave. The hydrothermally treated slurry of aluminum hydroxide was subjected to filtration again, whereby a cake of pseudoboehmite E containing about 25% by weight of pseudoboehmite in terms of $Al_2O_3$ was obtained. The X-ray diffraction spectrum of the pseudoboehmite E is shown in FIG. 5.

The procedures hereinabove described were repeated, except that the hydrothermal treatment in an autoclave was carried out at 170° C. for two hours, whereby a cake of pseudoboehmite F containing about 25% by weight of pseudoboehmite in terms of $Al_2O_3$ was obtained. Its X-ray diffraction spectrum is shown in FIG. 6.

EXAMPLE 1

55 g of the sepiolite powder shown in Table 1, 250 g of the cake of pseudoboehmite C containing 50 g of pseudoboehmite in terms of $Al_2O_3$ and about one liter of distilled water were placed in a paddle type agitator having a volume of 25 liters. After the liquid was adjusted to a pH of about 8 with 28% by weight aqueous ammonia, it was vigorously agitated for about 25 minutes to form a gel. About one liter of water was added into the gel, and it was vigorously agitated for about five minutes. The resulting mixture was placed in a vacuum filter and dehydrated, whereby a cake weighing about 315 g was obtained. The cake was extrusion molded into 1.2 mm dia. cylindrical pieces. They were allowed to dry at room temperature for three days, and after they were dried with hot air at about 120° C. for six hours, they were calcined in an air bath at 500° C. for 1.5 hours.

400 ml of warm water were added into 151.9 g of ammonium molybdate. After they were further mixed with an aqueous solution obtained by dissolving 160.5 g of cobalt nitrate in 400 ml of distilled water, 500 ml of 25% by weight of aqueous ammonia were added into the mixture. 35 ml of the resulting solution was diluted with 5 ml of distilled water, and the diluted solution was applied uniformly to 50 g of the aforementioned calcined product by spraying and impregnation. After the product was held in a sealed condition overnight, it was allowed to dry at room temperature. Then, it was dried with hot air at 120° C. for three hours, and calcined at 500° C. for three hours in an air stream, whereby catalyst I was prepared.

The procedures hereinabove described for the preparation of catalyst I were repeated, except that pseudoboehmites B and D each containing 50 g of $Al_2O_3$ were used instead of psueodoboehmite C, whereby catalysts III and IV were obtained.

COMPARATIVE EXAMPLE 1

The procedures for the preparation of catalysts I were repeated, except that pseudoboehmites A, E and F each containing 50 g of Al₂O₃ were used instead of pseudoboehmite C, whereby catalysts II, V and VI were obtained.

EXAMPLE 2

The procedures described for the preparation of catalyst I were repeated by mixing different proportions of the sepiolite powder and the pseudoboehmite C. Catalyst VII was prepared by mixing 83 g of the sepiolite and 125 g of pseudoboehmite C, catalyst VIII by mixing 33 g of the sepiolite and 350 g of pseudoboehmite C, and catalyst IX by mixing 22 g of the sepiolote and 400 pseudoboehmite C.

COMPARATIVE EXAMPLE 2

The procedures for the preparation of catalyst I were repeated, but catalyst X was prepared solely from 100 g of sepiolite without incorporating any pseudoboehmite.

EXAMPLE 3

The procedures of Example 1 were repeated, but catalyst XI was prepared from 83 g of the attapulgite as shown in Table 1 and 125 g of pseudoboehmite C.

EXAMPLE 4

Catalyst VII prepared as described in Example 2 was impregnated with a warm aqueous solution containing about 4% by weight of orthoboric acid, so that the catalyst might contain 5% by weight of boria. The catalyst was dried with hot air at 120° C. for three hours and calcined at 500° C. for two hours, whereby catalyst XII was prepared.

COMPARATIVE EXAMPLE 3

83 g of sepiolite powder, 125 g of pseudoboehmite C and about one liter of distilled water were placed in a paddle type agitator having a volume of 25 liters. After the liquid was adjusted to a pH of about 3 with hydrochloric acid, it was vigorously agitated for about 25 minutes to form a gel. Then, the procedures of Example 1 were repeated, and catalyst XIII was prepared.

EXAMPLE 5

2 kg of the sepiolite powder shown in Table 1 and 3 kg of pseudoboehmite C were placed in a kneader, and kneaded with one liter of distilled water for about one hour. The kneaded product had a water content of about 67% by weight. The kneaded product was extrusion molded into cylindrical pieces through a die having a 1.0 mm dia. hole. The molded products were dried with hot air at about 120° C. for three hours, and further precalcined at 500° C. for three hours, whereby a precalcined product weighing about 1 kg was obtained.

The procedures of Example 1 were repeated for supporting molybdenum and cobalt to 50 g of the precalcined product, whereby catalyst XIV was prepared.

COMPARATIVE EXAMPLE 4

2 kg of the sepiolite powder shown in Table 1 and 3 kg of pseudoboehmite C were placed in a kneader, and kneaded with 8.2 kg of distilled water for about one hour. The kneaded product had a water content of about 82% by weight. An attempt was made to extrusion mold the kneaded product into cylindrical shapes through a die having a 1.0 mm dia. hole, but failed because of its high water content.

3 kg of pseudoboehmite C dried at 100° C. and containing about 35% by weight of boehmite in terms of alumina were mixed with 2 kg of the sepiolite shown in Table 1. They were placed in kneader and kneaded for about one hour. The kneaded product had a water content of about 35% by weight. Catalyst XV was prepared from the kneaded product as described in Example 5.

EXAMPLE 6

The calcined product obtained as described in Example 1 was hydrotreated under the reaction conditions shown in Table 3 below using a heavy hydrocarbon oil containing a large quantity of vanadium as shown in Table 4. After 100 hours, there was obtained catalyst XVI carrying vanadium thereon. The apparatus used therefore was a fixed bed flow type reaction system having a reactor filled with 50 cc of the catalyst. Catalyst XVI contained 9% by weight of vanadium.

Table 2 shows the physical properties of all of the catalysts prepared as described in the foregoing Examples and Comparative Examples. The surface area, pore volume and average pore diameter shown therein were determined for pores having diameters of at least 75 Å, by a Carlo Erba Model 70 mercury porosimeter.

TABLE 2

| Catalyst No. | I | II | III | IV | V | VI | VII | VIII | IX | X | XI | XII | XIII | XIV | XV | XVI |
|---|---|---|---|---|---|---|---|---|---|---|---|---|---|---|---|---|
| Surface area ($m^2/g$) | 155 | 40 | 161 | 115 | 113 | 102 | 112 | 177 | 188 | 105 | 71 | 106 | 79 | 120 | 104 | 141 |
| Surface area defined by pores of 100 Å or larger diameter ($m^2/g$) | 123 | 13 | 125 | 106 | 104 | 84 | 94 | 109 | 115 | 96 | 62 | 88 | 61 | 106 | 77 | 110 |
| Pore volume (cc/g) | 0.70 | 0.10 | 0.64 | 0.72 | 0.70 | 0.79 | 0.75 | 0.60 | 0.54 | 0.73 | 0.73 | 0.71 | 0.49 | 0.70 | 0.45 | 0.67 |
| 75–100Å | 0.07 | 0.06 | 0.08 | 0.02 | 0.02 | 0.04 | 0.04 | 0.15 | 0.16 | 0.02 | 0.02 | 0.04 | 0.04 | 0.03 | 0.06 | 0.08 |
| 100–200Å | 0.26 | 0.03 | 0.31 | 0.13 | 0.10 | 0.15 | 0.14 | 0.30 | 0.34 | 0.13 | 0.07 | 0.13 | 0.11 | 0.13 | 0.19 | 0.29 |
| 200–400Å | 0.33 | 0.01 | 0.22 | 0.29 | 0.18 | 0.19 | 0.23 | 0.10 | 0.02 | 0.29 | 0.15 | 0.22 | 0.14 | 0.27 | 0.10 | 0.26 |
| 400Å or above | 0.05 | 0.00 | 0.04 | 0.28 | 0.40 | 0.41 | 0.34 | 0.05 | 0.02 | 0.29 | 0.50 | 0.32 | 0.20 | 0.27 | 0.10 | 0.04 |
| Average pore diameter (Å) | 181 | 100 | 159 | 250 | 248 | 280 | 267 | 136 | 114 | 279 | 414 | 268 | 248 | 233 | 173 | 190 |

Catalysts I to VI contained about 50% by weight (in terms of Al₂O₃) of pseudoboehmites C, A, B, D, E and F, respectively. All of catalysts I to VI, except catalyst II, had a pore volume of greater than 0.5 cc/g and a surface area of greater than 40 m²/g defined by pores having a diameter of at least 100 Å. Comparison of catalysts VII, I, VIII and IX containing about 25%, 50%, 70% and 80% by weight, respectively, of pseudoboehmite C (in terms of Al₂O₃) indicates that any amount of pseudoboehmite in excess of about 50% by weight tends to bring about a decrease in the pore volume of the catalyst, and particularly in the pore volume defined by the pores having a diameter of at least 200 Å.

It is also noted that catalyst X containing no pseudoboehmite, catalyst XI containing about 25% by weight of pseudoboehmite C and attapulgite, catalyst XII containing boria and catalyst XIV prepared from a kneaded mixture of sepiolite and pseudoboehmite C had a pore volume exceeding 0.5 cc/g, while catalyst XIII prepared with a pH value of about 3 when the gel was formed and catalyst XV prepared from a kneaded mixture containing about 35% by weight of water had a pore volume which was less than 0.5 cc/g.

EXAMPLE 7

Catalysts I to XVI were used for hydrotreating a heavy hydrocarbon oil having the properties shown in Table 4 below. The hydrotreatment was carried out by using a fixed bed flow type reaction system having a reactor filled with 50 cc of the catalyst, under the reaction conditions shown in Table 3. With the lapse of about 20 minutes after the operation was started, about 50 cc of the reaction product were sampled, and subjected to analysis.

The results of the hydrotreating operation are shown in Table 5 below.

TABLE 3

| | |
|---|---|
| Reaction temp. (°C.) | 405 |
| Reaction pressure (atm) | 140 |
| LHSV (Hr$^{-1}$) | 1.0 |
| H$_2$/oil ratio (Nl/l) | 1,000 |

TABLE 4

| Crude oil produced in Venezuela | |
|---|---|
| Specific gravity (D 15/4° C.) | 1.004 |
| Asphaltenes (wt %) | 11.8 |
| Sulfur (wt %) | 5.4 |
| Vanadium (ppm) | 1,240 |
| Nickel (ppm) | 106 |
| Nitrogen (ppm) | 5,900 |
| Conradson carbon residue (wt %0) | 15.9 |

TABLE 5

| | Amount in Product Oil | | |
|---|---|---|---|
| Catalyst No. | Asphaltenes (wt %) | Vanadium (ppm) | Sulfur (wt %) |
| I | 1.24 | 69 | 1.65 |
| II | 6.83 | 505 | 4.06 |
| III | 2.17 | 122 | 2.33 |
| IV | 2.52 | 136 | 2.31 |
| V | 2.95 | 159 | 2.78 |
| VI | 3.60 | 198 | 3.4 |
| X | 3.45 | 179 | 3.2 |

As is obvious from the results shown in Table 5, catalysts, I, III and IV containing pseudoboehmites C, B and D, respectively, showed an extremely improved activity for decomposition of asphaltenes, removal of vanadium and desulfurization, as compared with catalyst X composed of sepiolite alone. Catalyst V containing pseudoboehmite E had a slightly improved activity, but catalysts II and VI containing pseudoboehmites A and F, respectively, and not show any improved activity.

Figure 9:
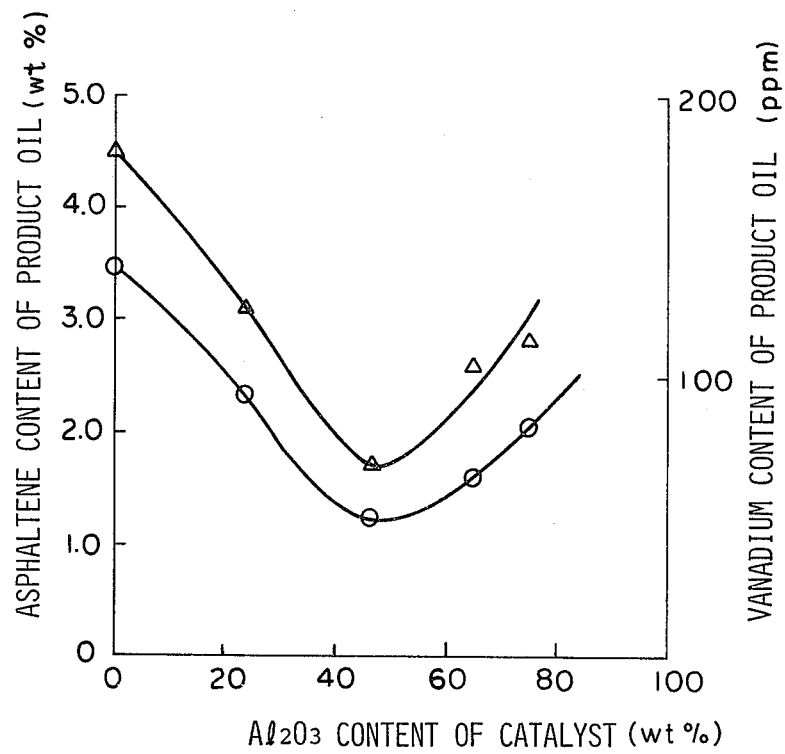
FIG. 9 shows the asphaltene and vanadium contents of the product oil in relation to the content of $Al_2O_3$ in the catalyst.

The results of hydrotreating in the presence of catalysts VII, I, VIII and IX containing sepiolite and about 25%, 50%, 70% and 80% by weight, respectively, of pseudoboehmite C in terms of Al$_2$O$_3$ are shown in FIG. 9. All of these catalysts showed an improved activity for asphaltene decomposition and vanadium removal as compared with catalyst X, but the improvement in their activity appeared to become lowered when the amount of pseudoboehmite C exceeded about 50% by weight.

Table 6 shows the results obtained by using catalysts VII, X, and XI to XVI.

TABLE 6

| | Amount in Product Oil | | | | |
|---|---|---|---|---|---|
| Catalyst No. | Asphaltenes (wt %) | Vanadium (ppm) | Sulfur (wt %) | Nitrogen (ppm) | Conradson carbon residue (wt %) |
| VII | 2.59 | 147 | 2.45 | 5,100 | 11.0 |
| X | 3.45 | 179 | 3.20 | 5,400 | 13.0 |
| XI | 2.55 | 143 | 2.34 | 5,200 | 11.5 |
| XII | 2.63 | 150 | 2.20 | 3,000 | 6 |
| XIII | 3.61 | 239 | 4.44 | 5,500 | 13.5 |
| XIV | 2.40 | 126 | 2.10 | 5,000 | 10.0 |
| XV | 4.50 | 270 | 4.80 | 5,600 | 14.0 |
| XVI | 3.40 | 185 | 3.35 | 5,400 | 13.0 |

As is obvious from Table 6, catalyst XI containing attapulgite and about 25% by weight, in terms of Al$_2$O$_3$, of pseudoboehmite C, and catalyst XIV prepared from a kneaded mixture of sepiolite and about 25% by weight, in terms of Al$_2$O$_3$, of pseudoboehmite C were comparable to catalyst VII in their activity for asphaltene decomposition, vanadium removal, desulfurization, denitrification and removal of Conradson carbon residue. Catalyst XII impregnated with orthoboric acid and containing 5% by weight of boria showed an improved activity for denitrification and removal of Conradson carbon residue, as compared with catalyst VII. Catalyst XIII prepared from a gel having a pH value of about 3, and catalyst XV prepared from a kneaded mixture having a water content of about 35% by weight (Comparative Examples 3 and 4) were both inferior to catalyst VII in their activity for asphaltene removal, vanadium removal, desulfurization, denitrification and removal of Conradson carbon residue. Catalyst XVI obtained by hydrotreatment with a heavy hydrocarbon oil containing a large quantity of vanadium and carrying vanadium was comparable to catalyst X in its activity for the various kinds of reactions.

EXAMPLE 8

The catalyst of this invention was compared with a catalyst containing no pseudoboehmite by a prolonged period of hydrotreating in a flow type fixed bed reactor filled with 500 cc of the catalyst, and in which the gas and the liquid co-currently flowed downwardly. The catalysts VII and X were compared for hydrotreating a vacuum residue having the properties shown in Table 7 under the reaction conditions shown in Table 8.

TABLE 7

| Khafji vacuum distillation residue | |
|---|---|
| Specific gravity (D15/4° C.) | 1.0233 |
| Asphaltene content (wt %) | 9.7 |
| Conradson carbon residue (wt %) | 21.8 |
| Sulfur content (wt %) | 4.59 |
| Nitrogen content (wt %) | 0.45 |
| Vanadium content (ppm) | 147 |
| Nickel content (ppm) | 49 |

TABLE 8

| | |
|---|---|
| Reaction pressure (kg/m$^2$G) | 140 |
| LHSV (Hr$^{-1}$) | 0.3 |
| H$_2$/oil ratio (Nl/l) | 1,000 |

Figure 10:
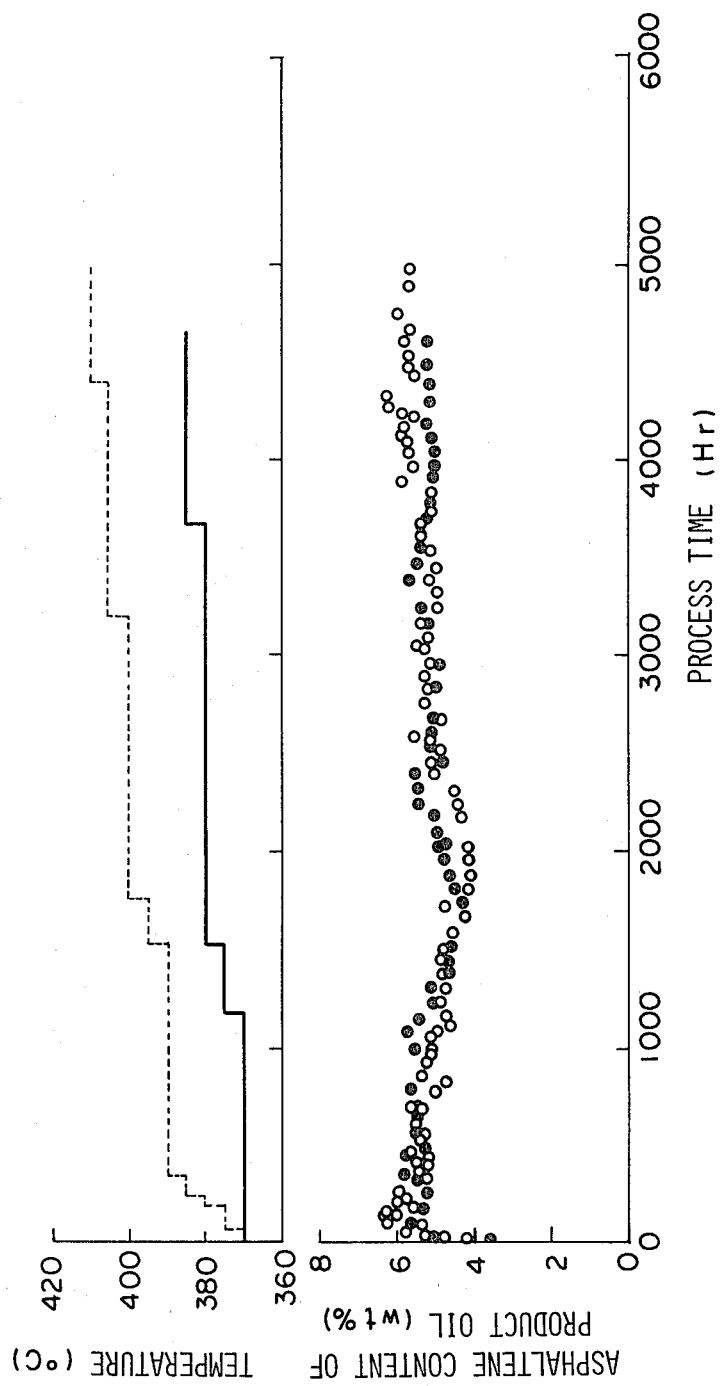
FIG. 10 shows the variation in the reaction temperature and the asphaltene content of the product oil in relation to the hydrotreating time.

It was intended to reduce the asphaltene content of the oil to 5.0 to 5.5% by weight, by increasing the reaction temperature gradually with the lapse of time after the oil to be treated was introduced into the reactor. FIG. 10 shows the temperature within the reactor and the asphaltene content of the product oil in relation to the lapse of time. In FIG. 10, the broken line showing the temperature in relation to the lapse of time refers to the reaction in the presence of catalyst X, and the solid line refers to the reaction in the presence of catalyst VII. Likewise, "white" circles indicate the asphaltene content of the oil treated in the presence of catalyst X, and "black" circles represent the same treated in the presence of catalyst VII. As is obvious from FIG. 10, the reactor filled with catalyst VII had a lower temperature than the reactor filled with catalyst X. This testifies the higher activity of the catalyst according to this invention. It is surprisingly noted from FIG. 10 that the catalyst of this invention showed the desired catalytic performance even after long period of service and that the reaction temperature required only a small degree of elevation in order to obtain the desired results when the catalyst of this invention was used. For example, catalyst VII could produce an oil having an asphaltene content of 5.5% by weight at a reaction temperature of 385° C. after the lapse of 4,000 hours, while catalyst X could only produce an oil having an asphaltene content of 6.0% by weight even at 405° C. after the lapse of the same length of time. This indicates that catalyst VII is more effective than catalyst X even if it is used at a temperature 20° C. lower than that for catalyst X. It is evident from the foregoing results that the catalyst of this invention shows a high activity for the hydrotreating of heavy hydrocarbon oils and maintains its high activity for a long period of time.

EXAMPLE 9

A vacuum residue of Middle Near East having the following properties was subjected to the two-stage hydrotreatment in accordance with the process of the present invention.

| Specific gravity | (°API) | 16.4 |
|---|---|---|
| Sulfur | (wt %) | 2.62 |
| Nitrogen | (wt %) | 0.36 |
| Conradon carbon residue | (wt %) | 8.9 |
| Asphaltenes | (wt %) | 2.9 |
| Vanadium | (wt ppm) | 130 |
| Nickel | (wt ppm) | 42 |

Used in the first stage was Catalyst III shown in Table 2. A coventional hydrodesulfurization catalyst having the composition and physical properties shown below was used in the second stage. The hydrodesulfurization catalyst was prepared by way of extrusion molding using a die having a hole of 0.7 mm diameter.

| Composition (wt %) | |
|---|---|
| Al$_2$O$_3$ | 80.0 |
| SiO$_2$ | 1.5 |
| MoO$_3$ | 14.2 |
| CoO | 3.7 |
| Physical Properties | |
| Surface area (m$^2$/g) | 173 |
| Pore volume (cc/g) | 0.66 |
| Pore size distribution | |
| Size (Å) | Volume (cc/g) |
| 35–100 | 0.04 |
| 100–200 | 0.48 |
| 200–300 | 0.13 |
| 300–600 | 0.01 |

Two fixed bed flow type reactors containing Catalyst III and the hydrodesulfurization catalyst, respectively, were connected in series, through which the charge stock and hydrogen were successively flown co-currently downward for contact with the catalysts. The two-stage hydrotreatment was performed isothermally under the following conditions.

| | First Stage | Second Stage |
|---|---|---|
| Reaction temperature (°C.) | 404 | 392 |
| Hydrogen pressure (atm) | 135 | 135 |
| LHSV (hour$^{-1}$) | 0.63 | 1.0 |
| Hydrogen to oil ratio (Nl/l) | 1000 | 1000 |

The two-stage hydrotreatment had been continued for 600 hours when there was obtained a product oil having the following properties.

| Specific gravity | (°API) | 21.7 |
|---|---|---|
| Sulfur | (wt %) | 0.28 |
| Nitrogen | (wt %) | 0.17 |
| Conradson carbon residue | (wt %) | 3.4 |
| Asphaltenes | (wt %) | 0.3 |
| Vanadium | (wt ppm) | 2.0 |
| Nickel | (wt ppm) | 2.5 |

EXAMPLE 10

The product oil obtained in Example 9 was subjected to hydrocracking using a conventional cylindrical catalyst having a catalyst diameter of 0.8 mm. The hydrocracking catalyst had the following composition and physical properties.

| Composition (wt %) | |
|---|---|
| Al$_2$O$_3$ | 87.2 |
| MoO$_3$ | 10.1 |
| CoO | 1.0 |
| NiO | 1.5 |
| Physical Properties | |
| Surface area (m$^2$/g) | 195 |
| Pore volume (cc/g) | 0.58 |
| Pore size distribution | |
| Size (Å) | Volume (cc/g) |
| 35–100 | 0.01 |
| 100–200 | 0.43 |
| 200–300 | 0.10 |
| >300 | 0.04 |

The hydrocracking catalyst was filled in a reactor of the same type as used in Example 9, through which were flown the product oil and hydrogen co-currently downward for contact with the catalyst under the following conditions.

| Reaction temperature | (°C.) | 417 |
|---|---|---|
| Hydrogen pressure | (atm) | 168 |
| LHVS | (hour$^{-1}$) | 0.31 |
| Hydrogen to oil ratio (Nl/l) | | 1000 |

The hydrocracking had been continued for 300 hours when the yields and properties of the products were analysed. The results were as summarized below.

| Yield | |
|---|---|
| $C_1$-$C_4$, wt % | 1.8 |
| Naphtha ($C_5$ - 350° F.), vol % | 20.8 |
| Kerosene (350–450° F.), vol % | 17.3 |
| Light oil (450–650° F.), vol % | 32.8 |
| Atmospheric residue (>650° F.), vol % | 46.9 |
| $H_2$ consumption (SCF/BBL) | 1820 |
| $H_2S$ + $NH_3$, vol % | 0.2 |

| Properties | Specific Gravity (°API) | Sulfur (ppm) | Nitrogen (ppm) | Aniline point (°C.) |
|---|---|---|---|---|
| Naphtha | 55.3 | trace | 4 | 53 |
| Kerosene | 38.3 | 6 | 7 | 51 |
| Light oil | 32.6 | 17 | 29 | 57 |
| Atmospheric residue | 24.7 | 120 | 320 | 87 |

EXAMPLE 11

The product oil obtained in Example 9 was subjected to catalytic cracking using an apparatus of a semi-batch mode. The apparatus was of a riser type pilot plant and consisted mainly of a catalyst feed tank, a riser reactor, a stripper and a product recovery system. Employed in this example was a conventional used catalyst taken out from a catalyst regeneration system of a commercially actually operated cracking plant. The catalyst had been prepared by dispersing commercially available zeolite, ion-exchanged with a rare earth metal, into amorphous silica-alumina. The used catalyst had the following composition.

| $SiO_2$ | (wt %) | 59.6 |
|---|---|---|
| $Al_2O_3$ | (wt %) | 37.4 |
| $Re_2O_5$ | (wt %) | 2.6 |
| Na | (wt %) | 0.3 |
| Ni | (wt ppm) | 17 |
| V | (wt ppm) | 36 |
| Fe | (wt ppm) | 2200 |

The catalyst was charged in the catalyst feed tank and maintained in fluidized form on a nitrogen stream. A portion of the fluidized catalyst was constantly discharged from the tank, through an orifice provided at the bottom thereof, and introduced into a stock oil feed zone where it was mixed with the product oil to be treated supplied thereto in atomized form through a spray nozzle. The mixture in the stock oil feed zone was then delivered into the riser reactor where it was subjected to the cracking conditions shown below.

| Reaction temperature (°C.) | 547 |
|---|---|
| Stripper temperature (°C.) | 547 |
| Catalyst feeding tank temperature (°C.) | 660 |
| Oil retention time in riser pipe (sec) | 3.9 |
| Catalyst to oil ratio (wt/wt) | 6.3 |

After five hours from the commencement of the cracking operation, the system was found to be in a stationary state. The yields of the products at this point in time were as follows.

| Debutanized gasoline | (vol %) | 53.0 |
|---|---|---|
| Total $C_4$ | (vol %) | 13.1 |
| Total $C_3$ | (vol %) | 12.2 |
| <$C_2$ | (wt %) | 4.9 |
| Conversion rate (430° F. base) | (wt %) | 75.1 |

The gasoline was found to have a research octane number of 90.5.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A catalyst for hydrotreating heavy hydrocarbon oils, comprising:
   a carrier which is a calcined composite of a mixture of a clay mineral consisting mainly of magnesium silicate having a double-chain structure and a pseudoboehmite which shows a powder X-ray diffraction spectrum obtained by applying a $CuK_\alpha$ ray such that the half value width of the peak on the (020) plane is between about 0.8° and 4.0° and the intensity of said peak is between 1.2 and 8.0 times as high as that at $2\theta = 10°$; and
   at least one catalytic metal component composited with said carrier, the metal of said catalytic metal component being selected from the group consisting of the metals belonging to Groups VB, VIB, VIII and IB of the Periodic Table.

2. A catalyst as set forth in claim 1, wherein the amount of aluminum components formed from said pseudoboehmite is between 10 and 80% in terms of $Al_2O_3$ based on the total weight of the catalyst.

3. A catalyst as set forth in claim 1, wherein the amount of said at least one catalytic component is between about 0.1 and about 20% in terms of metal element based on the total weight of the catalyst.

4. A catalyst as set forth in claim 1, having a pore volume of between about 0.5 and about 2.0 cc/g, an average pore diameter of between about 100 and about 500 Å, and a surface area of between about 40 and about 400 $m^2$/g defined by pores having a diameter of at least 100 Å.

5. A catalyst as set forth in any one of claims 1 through 4, wherein said clay mineral comprises at least one member selected from the group consisting of sepiolite, attapulgite and palygorskite.

6. A catalyst as set forth in claim 1, wherein the metal of said catalytic metal component is selected from the group consisting of vanadium, chromium, molybdenum, tungsten, cobalt, nickel and copper.

7. A catalyst as set forth in claim 1, further comprising at least one auxiliary component composited with said carrier and selected from the group consisting of boron, phosphorous, fluorine and compounds thereof, said at least one auxiliary component being present in an amount of between about 0.2 and about 4.0% in terms of element based on the total weight of the catalyst.

8. A method of preparing a catalyst, comprising the steps of:
   (a) commingling a clay mineral consisting mainly of magnesium silicate having a double-chain structure with a pseudoboehmite in the presence of water to form a mixture having a water content of between about 40 and about 80% by weight, said pseudoboehmite showing a powder X-ray diffraction spectrum obtained by applying a $CuK_\alpha$ ray such that the half value width of the peak on the (020) plane is between about 0.8° and 4.0° and the intensity of said peak is between 1.2 and 8.0 times as high as that at $2\theta=10°$;
(b) molding the mixture;
(c) supporting at least one catalytic metal component on the mixture, the metal of said catalytic metal component being selected from the group consisting of the metals belonging to Groups VB, VIB, VIII and IB of the Periodic Table; and
(d) calcining the mixture.

9. A method as set forth in claim 8, wherein step (a) comprises kneading the clay mineral, the pseudoboehmite and about 40 to about 80% by weight of water.

10. A method as set forth in claim 8, wherein step (a) comprises mixing the clay mineral, the pseudoboehmite and water in an amount at least about three times by weight as much as said clay mineral to form a paste, and controlling the water content of the paste to about 40 to about 80% by weight.

11. A method as set forth in any one of claims 8 through 10, wherein the pseudoboehmite is used in an amount so that the catalyst may contain 10 to 80% by weight of aluminum components formed from the pseudoboehmite in terms of $Al_2O_3$.

12. A method as set forth in claim 8, wherein the sequence of steps is (a), (b), (c) and (d) and wherein step (c) includes drying the molded mixture and impregnating the dried mixture with a solution containing a compound containing the metal of the catalytic metal component.

13. A method as set forth in claim 8, wherein the sequence of steps is (a), (b), (c) and (d) and wherein step (c) includes drying and precalcining the molded mixture, and impregnating the precalcined mixture with a solution containing a compound containing the metal of the catalytic metal component.

14. A method as set forth in claim 8, wherein step (c) is conducted concurrently with step (a) and wherein a compound containing the metal of the catalytic metal component is added to the clay mineral and/or the pseudoboehmite.

15. A method as set forth in claim 8, wherein the pseudoboehmite used is obtained by:
establishing a seed aluminum hydroxide hydrosol having a pH of between about 6 and 10 at a temperature of at least 50° C., and
sequentially adding
an aluminum compound to said hydrosol in an amount of between 2 and 200 molar % based on the hydrosol to adjust the pH of said hydrosol to a value of less than 5 or more than 11, and then adding a neutralizing agent to said hydrosol to return the pH to the range of between about 6 and about 10, said sequential addition of said aluminum compound and of said neutralizing agent being repeated to continue the growth of hydrated aluminum oxide crystallites.

16. A method as set forth in claim 8, wherein the catalytic metal component includes a vanadium component and wherein the step of supporting the vanadium component includes contacting the calcined mixture with a heavy hydrocarbon oil containing at least 200 ppm by weight of vanadium at a temperature of between 350° C. and 450° C. and a pressure of 30 to 250 atmosphere in the presence of hydrogen.

* * * * *